(12) United States Patent
Green et al.

(10) Patent No.: US 9,053,911 B2
(45) Date of Patent: *Jun. 9, 2015

(54) METHOD OF PROCESSING MASS SPECTRAL DATA

(71) Applicant: Micromass UK Limited, Wilmslow (GB)

(72) Inventors: Martin Raymond Green, Cheshire (GB); Garry Michael Scott, Lancashire (GB); Nicholas Lester St Hill, Merseyside (GB)

(73) Assignee: Micromass UK Limited, Wilmslow (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/187,456

(22) Filed: Feb. 24, 2014

(65) Prior Publication Data

US 2014/0166877 A1    Jun. 19, 2014

Related U.S. Application Data

(63) Continuation of application No. 13/375,056, filed as application No. PCT/GB2010/001052 on May 28, 2010, now Pat. No. 8,658,971.

(60) Provisional application No. 61/182,143, filed on May 29, 2009.

(30) Foreign Application Priority Data

May 29, 2009   (GB) .................................. 0909289.1

(51) Int. Cl.
*H01J 49/40* (2006.01)
*H01J 49/00* (2006.01)
*G06K 9/00* (2006.01)

(52) U.S. Cl.
CPC ........... *H01J 49/0036* (2013.01); *G06K 9/0053* (2013.01); *H01J 49/40* (2013.01)

(58) Field of Classification Search
CPC ....................................................... H01J 49/40
USPC ........................................................ 250/287
See application file for complete search history.

(56) References Cited

U.S. PATENT DOCUMENTS 5,672,869 A * 9/1997 Windig et al. ................ 250/282
7,202,473 B2   4/2007 Bateman et al.

(Continued)

FOREIGN PATENT DOCUMENTS

EP    1736911    12/2006
GB    2405991    3/2005

(Continued)

OTHER PUBLICATIONS

Chapman, "*Computerised Mass Spectrometry*", Journal of Physics E. Scientific Instruments, vol. 13, pp. 365-375, 1980.

*Primary Examiner* — Phillip A Johnston
(74) *Attorney, Agent, or Firm* — Diederiks & Whitelaw, PLC

(57) ABSTRACT

A method of processing mass spectral data is disclosed comprising digitizing a first signal output from an ion detector to produce a first digitized signal. A first set of peaks in the first digitized signal is detected and the arrival time $T_o$ and peak area $S_o$ of one or more peaks in the first set of peaks are determined thereby forming a first list of data pairs, each data pair comprising an arrival time value and a peak area value. One or more data pairs from the first list are then filtered out thereby forming a second reduced list, wherein a data pair is filtered out, attenuated or otherwise rejected from the first list if the peak area value of a data pair in the first list is determined to be less than a threshold peak area.

13 Claims, 13 Drawing Sheets

(56) References Cited

U.S. PATENT DOCUMENTS

| | | |
|---|---|---|
| 7,488,935 B2 | 2/2009 | Altmayer |
| 7,501,621 B2 * | 3/2009 | Willis et al. ............... 250/287 |
| 8,063,358 B2 | 11/2011 | Bateman et al. |
| 8,119,411 B2 | 2/2012 | Miyazaki et al. |
| 8,178,834 B2 * | 5/2012 | Gorenstein et al. ......... 250/282 |
| 8,354,634 B2 | 1/2013 | Green et al. |
| 8,598,513 B2 * | 12/2013 | Gilbert et al. ............. 250/282 |
| 8,809,767 B2 | 8/2014 | Bateman et al. |
| 2006/0045207 A1 | 3/2006 | Cheng et al. |

FOREIGN PATENT DOCUMENTS

| | | |
|---|---|---|
| GB | 2439794 | 1/2008 |
| GB | 2439795 | 1/2008 |
| JP | 08212968 | 8/1996 |
| JP | 2005221276 | 8/2005 |
| JP | 2005268152 | 9/2005 |
| WO | WO 2004/102180 | 11/2004 |
| WO | WO 2007/138338 | 12/2007 |

* cited by examiner

METHOD OF PROCESSING MASS SPECTRAL DATA

CROSS REFERENCE TO RELATED APPLICATIONS

This application is a continuation of U.S. application Ser. No. 13/375,056 filed Nov. 29, 2011 which is the National Stage of International Application No. PCT/GB2010/001052 filed May 28, 2010 which claims priority to and benefit of U.S. Provisional Patent Application Ser. No. 61/182,143 filed on 29 May 2009 and United Kingdom Patent Application No. 0909289.1 filed on 29 May 2009. The entire contents of these applications are incorporated herein by reference.

BACKGROUND OF THE INVENTION

The present invention relates to a mass spectrometer, a method of mass spectrometry and a method of processing mass spectral data.

A known method of obtaining a mass spectrum is to record the output signal from an ion detector of a mass analyser as a function of time using a fast Analogue to Digital Converter (ADC). It is known to use an Analogue to Digital Converter with a scanning magnetic sector mass analyser, a scanning quadrupole mass analyser or an ion trap mass analyser.

If a mass analyser is scanned very quickly for a relatively long period of time (e.g. over the duration of a chromatography separation experimental run) then it is apparent that very large amounts of mass spectral data will be acquired if an Analogue to Digital Converter is used. Storing and processing a large amount of mass spectral data requires a large memory which is disadvantageous. Furthermore, the large amount of data has the effect of slowing subsequent processing of the data. This can be particularly problematic for real time applications such as Data Dependent Acquisitions (DDA).

Due to the problems of using an Analogue to Digital Converter with a Time of Flight mass analyser it is common, instead, to use a Time to Digital Converter (TDC) detector system with a Time of Flight mass analyser. A Time to Digital Converter differs from an Analogue to Digital Converter in that a Time to Digital Converter records just the time that an ion is recorded as arriving at the ion detector. As a result, Time to Digital Converters produce substantially less mass spectral data which makes subsequent processing of the data substantially easier. However, one disadvantage of Time to Digital Converters is that they do not output an intensity value associated with an ion arrival event. Time to Digital Converters are, therefore, unable to discriminate between one or multiple ions arriving at the ion detector at substantially the same time.

Conventional Time of Flight mass analysers sum the ion arrival times as determined by a Time to Digital Converter system from multiple acquisitions. No data is recorded at times when no ions arrive at the ion detector. A composite histogram of the times of recorded ion arrival events is then formed. As more and more ions are added to the histogram from subsequent acquisitions, the histogram progressively builds up to form a mass spectrum of ion counts versus flight time (or mass to charge ratio).

Conventional Time of Flight mass analysers may collect, sum or histogram many hundreds or even thousands of separate time of flight spectra obtained from separate acquisitions in order to produce a final composite mass spectrum. The mass spectrum or histogram of ion arrival events may then be stored to computer memory.

One disadvantage of conventional Time of Flight mass analysers is that many of the individual spectra which are histogrammed to produce a final mass spectrum may relate to acquisitions wherein only a few or no ion arrival events were recorded. This is particularly the case for orthogonal acceleration Time of Flight mass analysers operated at very high acquisition rates.

Known Time of Flight mass analysers comprise an ion detector comprising a secondary electron multiplier such as a microchannel plate (MCP) or discrete dynode electron multiplier. The secondary electron multiplier or discrete dynode electron multiplier generates a pulse of electrons in response to an ion arriving at the ion detector. The pulse of electrons or current pulse is then converted into a voltage pulse which may then be amplified using an appropriate amplifier.

State of the art microchannel plate ion detectors can produce a signal in response to the arrival of a single ion wherein the signal has a Full Width at Half Maximum of between 1 and 3 ns. A Time to Digital Converter (TDC) is used to detect the ion signal. If the signal produced by the electron multiplier exceeds a predefined voltage threshold then the signal may be recorded as relating to an ion arrival event. The ion arrival event is recorded just as a time value with no associated intensity information. The arrival time is recorded as corresponding to the time when the leading edge of the ion signal passes through the voltage threshold. The recorded arrival time will only be accurate to the nearest clock step of the Time to Digital Converter. A state of the art 10 GHz Time to Digital Converter is capable of recording ion arrival times to within ±50 ps.

One advantage of using a Time to Digital Converter to record ion arrival events is that any electronic noise can be effectively removed by applying a signal or voltage threshold. As a result, the noise does not appear in the final histogrammed mass spectrum and a very good signal to noise ratio can be achieved if the ion flux, is relatively low.

Another advantage of using a Time to Digital Converter is that the analogue width of the signal generated by a single ion does not add to the width of the ion arrival envelope for a particular mass to charge ratio value in the final histogrammed mass spectrum. Since only ion arrival times are recorded the width of mass peaks in the final histogrammed mass spectrum is determined only by the spread in ion arrival times for each mass peak and by the variation in the voltage pulse height produced by an ion arrival event relative to the signal threshold.

However, an important disadvantage of conventional Time of Flight mass analysers comprising an ion detector including a Time to Digital Converter detector is that the Time to Digital Converter detector is unable to distinguish between a signal arising due to the arrival of a single ion at the ion detector and that of a signal arising due to the simultaneous arrival of multiple ions at the ion detector. This inability to distinguish between single and multiple ion arrival events leads to a distortion of the intensity of the final histogram or mass spectrum. Furthermore, an ion arrival event will only be recorded if the output signal from the ion detector exceeds a predefined voltage threshold.

Known ion detectors which incorporate a Time to Digital Converter system also suffer from the problem that they exhibit a recovery time after an on arrival event has been recorded during which time the signal must fall below the predetermined voltage signal threshold. During this dead time no further ion arrival events can be recorded.

At relatively high ion fluxes the probability of several ions arriving at the ion detector at substantially the same time during an acquisition can become relatively significant. As a result, dead time effects will lead to a distortion in the intensity and mass to charge ratio position in the final histogrammed mass spectrum. Known mass analysers which use a Time to Digital Converter detector system therefore suffer from the problem of having a relatively limited dynamic range for both quantitative and qualitative applications.

In contrast to the limitations of a Time to Digital Converter system, multiple ion arrival events can be accurately recorded using an Analogue to Digital Converter system. An Analogue to Digital Converter system can record the signal intensity at each clock cycle.

Known Analogue to Digital recorders can digitise a signal at a rate, for example, of 2 GHz whilst recording the intensity of the signal as a digital value of up to eight bits. This corresponds to an intensity value of 0-255 at each time digitisation point. Analogue to Digital Converters are also known which can record a digital intensity value at up to 10 bits, but such Analogue to Digital Converters tend to have a limited spectral repetition rate.

An Analogue to Digital Converter produces a continuum intensity profile as a function of time corresponding to the signal output from the electron multiplier. Time of flight spectra from multiple acquisitions can then be summed together to produce a final mass spectrum.

An advantageous feature of an Analogue to Digital Converter system is that an Analogue to Digital Converter system can output an intensity value and can therefore record multiple simultaneous ion arrival events by outputting an increased intensity value. In contrast, a Time to Digital Converter system is unable to discriminate between one or multiple ions arriving at the ion detector at substantially the same time.

Analogue to Digital Converters do not suffer from dead time effects which may be associated with a Time to Digital Converter which uses a detection threshold. However, Analogue to Digital Converters suffer from the problem that the analogue width of the signal from individual ion arrivals adds to the width of the ion arrival envelope. Accordingly, the mass resolution of the final summed or histogrammed mass spectrum may be reduced compared to a comparable mass spectrum produced using a Time to Digital Converter based system.

Analogue to Digital Converters also suffer from the problem that any electronic noise will also be digitised and will appear in each time of flight spectrum corresponding to each acquisition. This noise will then be summed and will be present in the final or histogrammed mass spectrum. As a result, relatively weak ion signals can be masked and this can lead to relatively poor detection limits compared to those obtainable using a Time to Digital Converter based system.

It is desired to provide an improved mass spectrometer and method of mass spectrometry.

SUMMARY OF THE INVENTION

According to an aspect of the present invention there is provided a method of mass spectrometry comprising:

digitising a first signal output from an ion detector to produce a first digitised signal;

detecting a first set of peaks in the first digitised signal and determining the arrival time $T_o$ and peak area $S_o$ of one or more peaks in the first set of peaks thereby forming a first list of data pairs, each data pair comprising an arrival time value and a peak area value; and filtering out, attenuating or otherwise rejecting one or more data pairs from the first list thereby forming a second reduced list, wherein a data pair is filtered out, attenuated or otherwise rejected from the first list if the peak area value of a data pair in the first list is determined to be less than a threshold peak area.

An important aspect of the preferred embodiment is that the step of filtering out, attenuating or otherwise rejecting data pairs from the first list is performed prior to histogramming or otherwise combining mass spectral data from separate acquisitions in order to build or form a composite mass spectrum.

According to the preferred embodiment area thresholding is performed on a push-by-push basis which enables the knowledge of the shape of an individual ion to determine the area threshold.

If area thresholding is performed after histogramming of mass spectral data then any area threshold will be more arbitrary due to the variation in height of ions. The area threshold must also be dependent upon the number of pushes used to create a scan.

An advantage of the preferred embodiment is that performing area thresholding on a push-by-push case enables the system to make a reasonably accurate determination of the minimum area of an ion since it is possible to characterise the shape of ion peaks and any variation in height and/or variation in width. Ion width is typically fairly constant and hence variation in ion width may be minimal.

As will be explained in more detail below, an amplitude threshold may also be used but is not essential. In practice the application of an amplitude threshold helps to reduce the amount of data that the system has to deal with because there is a finite bandwidth in terms of processing power. According to an embodiment the amplitude threshold may be set at 3σ below the background noise level if Gaussian noise is assumed. According to an embodiment an amplitude threshold may be set below the background noise if the background noise is sitting on a DC level in which case the amplitude threshold helps to remove the DC level but may not actually remove the background noise.

In summary, according to the preferred embodiment an area threshold is applied to mass spectral data on a push-to-push basis prior to combining or histogramming time and intensity data pairs so that noise spikes are rejected prior to combining or histogramming time and intensity data.

According to an embodiment the method preferably comprises after the step of filtering out, attenuating or otherwise rejecting one or more data pairs the step of:

converting the determined arrival time values $T_0$ of data pairs in the second reduced list into a first arrival time $T_n$ and a second arrival time $T_{n+1}$ and/or converting the determined peak area values $S_o$ of data pairs in second reduced list into a first peak area $S_n$ and a second peak area $S_{n+1}$.

According to an embodiment:

(i) the first signal comprises an output signal, a voltage signal, an ion signal, an ion current, a voltage pulse or an electron current pulse; and/or (ii) the ion detector comprises a microchannel plate, a photomultiplier or an electron multiplier device; and/or (iii) the ion detector comprises a current to voltage converter or amplifier for producing a voltage pulse in response to the arrival of one or more ions at the ion detector.

According to an embodiment the method preferably comprises applying an amplitude threshold to the first digitised signal prior to determining the arrival time $T_o$ and prior to determining the intensity $S_o$ of one or more peaks in the first set of peaks in order to filter out at least some noise peaks from the first digitised signal.

According to an embodiment the method preferably comprises smoothing the first digitised signal using a moving average, boxcar integrator, Savitsky Golay or Hites Biemann algorithm prior to determining the arrival time $T_o$ and prior to determining the intensity $S_o$ of one or more peaks in the first set of peaks.

According to an embodiment the method preferably comprises determining or obtaining a second differential or a second difference of the first digitised signal prior to determining the arrival time $T_o$ and prior to determining the intensity $S_o$ of one or more peaks in the first set of peaks.

According to an embodiment the method preferably comprises the step of determining the arrival time $T_o$ of one or more peaks in the first set of peaks ions comprises determining one or more zero crossing points of the second differential of the first digitised signal.

According to an embodiment the method preferably comprises:

determining or setting a start time $T_{0start}$ of an ion arrival event as corresponding to a digitisation interval which is immediately prior or subsequent to the time when the second differential of the first digitised signal falls below zero or another value; and determining or setting an end time $T_{0end}$ of an ion arrival event as corresponding to a digitisation interval which is immediately prior or subsequent to the time when the second differential of the first digitised signal rises above zero or another value.

According to an embodiment the method preferably comprises (i) determining the intensity of one or more peaks present in the first digitised signal which correspond to one or more ion arrival events, wherein the step of determining the intensity of one or more peaks present in the first digitised signal comprises determining the area of one or more peaks present in the first digitised signal bounded by the start time $T_{0start}$ and/or by the end time $T_{0end}$; and/or (ii) determining the moment of one or more peaks present in the first digitised signal which correspond to one or more ion arrival events, wherein the step of determining the moment of one or more peaks present in the first digitised signal which correspond to one or more ion arrival events comprises determining the moment of a peak bounded by the start time $T_{0start}$ and/or by the end time $T_{0end}$; and/or (iii) determining the centroid time of one or more peaks present in the first digitised signal which correspond to one or more ion arrival events; and/or (iv) determining the average or representative time of one or more peaks present in the first digitised signal which correspond to one or more ion snivel events.

The method preferably further comprises storing the first arrival time $T_n$ and/or the second arrival time $T_{n+1}$ in two or more substantially neighbouring or adjacent pre-determined time bins or memory locations.

According to an embodiment:

(i) the first arrival time $T_n$ is stored in a time bin or memory location immediately prior to or which includes the determined arrival time $T_0$; and/or (ii) the second arrival time $T_{n+1}$ is stored in a pre-determined time bin or memory location immediately subsequent to or which includes the determined arrival time $T_o$.

According to an embodiment the method preferably comprises storing the first intensity or area $S_n$ and/or the second intensity or area $S_{n+1}$ in two or more substantially neighbouring or adjacent pre-determined time bins or memory locations.

According to an embodiment:

(i) the first intensity or area $S_n$ is stored in a pre-determined time bin or memory location immediately prior to or which includes the determined arrival time $T_0$; and/or (ii) the second intensity or area $S_{n+1}$ is stored in a pre-determined time bin or memory location immediately subsequent to or which includes the determined arrival time $T_0$.

According to an embodiment each predetermined time bin or memory location has a width, wherein the width falls within a range selected from the group consisting of: (i) <1 ps; (ii) 1-10 ps; (iii) 10-100 ps; (iv) 100-200 ps; (v) 200-300 ps; (vi) 300-400 ps; (vii) 400-500 ps; (viii) 500-600 ps; (ix) 600-700 ps; (x) 700-800 ps; (xi) 800-900 ps; (xii) 900-1000 ps; (xiii) 1-2 ns; (xiv) 2-3 ns; (xv) 3-4 ns; (xvi) 4-5 ns; (xvii) 5-6 ns; (xviii) 6-7 ns; (xix) 7-8 ns; (xx) 8-9 ns; (xxi) 9-10 ns; (xxii) 10-100 ns; (xxiii) 100-500 ns; (xxiv) 500-1000 ns; (xxv) 1-10 µs; (xxvi) 10-100 µs; (xxvii) 100-500 µs; (xxviii) >500 µs.

According to an embodiment:

(i) the determined intensity $S_0$ follows the relationship $S_0 = S_n + S_{n+1}$; and/or (ii) $S_o \cdot T_o$ follows the relationship $S_n \cdot T_n + S_{n+1} \cdot T_{n+1} = S_0 \cdot T_0$ According to an embodiment the method preferably comprises replacing the determined arrival time $T_0$ and the determined intensity $S_0$ of at least some of the peaks in the second reduced set of peaks with the first arrival time $T_n$ and the first intensity or area $S_n$ and the second arrival time $T_{n+1}$ and the second intensity or area $S_{n+1}$.

According to an embodiment the method preferably comprises obtaining the first signal over an acquisition time period, wherein the length of the acquisition time period is selected from the group consisting of: (i) <1 µs; (ii) 1-10 µs; (iii) 10-20 µs; (iv) 20-30 µs; (v) 30-40 µs; (vi) 40-50 µs; (vii) 50-60 µs; (viii) 60-70 µs; (ix) 70-80 µs; (x) 80-90 µs; (xi) 90-100 µs; (xii) 100-110 µs; (xiii) 110-120 µs; (xiv) 120-130 µs; (xv) 130-140 µs; (xvi) 140-150 µs; (xvii) 150-160 µs; (xviii) 160-170 µs; (xix) 170-180 µs; (xx) 180-190 µs; (xxi) 190-200 µs; (xxii) 200-250 µs; (xxiii) 250-300 µs; (xxiv) 300-350 µs; (xxv) 350-400 µs; (xxvi) 450-500 µs; (xxvii) 500-1000 µs; and (xxviii) >1 ms;

wherein the method further comprises sub-dividing the acquisition time period into n time bins or memory locations, wherein n is selected from the group consisting of: (i) <100; (ii) 100-1000; (iii) 1000-10000; (iv) 10,000-100,000; (v) 100,000-200,000; (vi) 200,000-300,000; (vii) 300,000-400,000; (viii) 400,000-500,000; (ix) 500,000-600,000; (x) 600,000-700,000; (xi) 700,000-800,000; (xii) 800,000-900,000; (xiii) 900,000-1,000,000; and (xiv) >1,000,000.

According to the preferred embodiment each the time bin or memory location has substantially the same length, width or duration. However, other embodiments are contemplated wherein the bins or memory locations may vary in length, width or duration preferably to a predetermined function. For example, according to an embodiment the time data may be converted or otherwise recorded as mass or mass to charge ratio data in which case each bin or memory location preferably has a width which is slightly different.

According to an embodiment the method preferably comprises using an Analogue to Digital Converter or a transient recorder to digitise the first signal.

According to an embodiment:

(a) the Analogue to Digital Converter or transient recorder comprises a n-bit Analogue to Digital Converter or transient recorder, wherein n comprises 5, 6, 7, 8, 9, 10, 11, 12, 13, 14, 15, 16, 17, 18, 19, 20 or >20; and/or (b) the Analogue to Digital Converter or transient recorder has a sampling or acquisition rate selected from the group consisting of: (i) <1 GHz; (ii) 1-2 GHz; (iii) 2-3 GHz; (iv) 3-4 GHz; (v) 4-5 GHz; (vi) 5-6 GHz; (vii) 6-7 GHz; (viii) 7-8 GHz; (ix) 8-9 GHz; (x) 9-10 GHz; and (xi) >10 GHz; and/or (c) the Analogue to Digital Converter or transient recorder has a digitisation rate which is substantially uniform or non-uniform.

According to an embodiment the method preferably comprises subtracting a constant number or value from the first digitised signal, wherein if a portion of the first digitised signal falls below zero after subtraction of a constant number or value from the first digitised signal then the method further comprises reselling the portion of the first digitised signal to zero.

According to an embodiment the method preferably comprises:

digitising one or more further signals output from the ion detector to produce one or more further digitised signals;

detecting a first set of peaks in the one or more further digitised signals and determining the arrival time $T_o$ and intensity $S_o$ of one or more peaks in the first set of peaks corresponding to the one or more further digitised signals;

determining the area of one or more peaks in the first set of peaks corresponding to the one or more further digitised signals and filtering out, attenuating or otherwise rejecting peaks in the first set of peaks corresponding to the one or more further digitised signals which are determined to have an area less than a threshold area thereby reducing the first set of peaks corresponding to the one or more further digitised signals to form a second reduced set of peaks corresponding to the one or more further digitised signals; and converting the determined arrival time $T_0$ of one or more peaks in the second reduced set of peaks corresponding to the one or more further digitised signals into a first arrival time $T_n$ and a second arrival time $T_{n+1}$ and/or converting the determined intensity $S_o$ of one or more peaks in the second reduced set of peaks corresponding to the one or more further digitised signals into a first intensity or area $S_n$ and a second intensity or area $S_{n+1}$.

According to an embodiment the one or more further signals comprise at least 5, 10, 15, 20, 25, 30, 35, 40, 45, 50, 55, 60, 65, 70, 75, 80, 85, 90, 95, 100, 200, 300, 400, 500, 600, 700, 800, 900, 1000, 2000, 3000, 4000, 5000, 6000, 7000, 8000, 9000 or 10000 signals from the ion detector, each signal corresponding to a separate experimental run or acquisition.

According to an embodiment the method preferably comprises combining or histogramming the first intensity $S_n$ value and the second intensity value $S_{n+1}$ corresponding to the first digitised signal with the first intensity $S_n$ value(s) and the second intensity value(s) $S_{n+1}$ corresponding to the one or more further digitised signals to form a composite time or mass spectrum.

According to an aspect of the present invention there is provided apparatus comprising:

a device arranged and adapted to digitise a first signal output from an ion detector to produce a first digitised signal;

a device arranged and adapted to detect a first set of peaks in the first digitised signal and to determine the arrival time $T_o$ and intensity $S_o$ of one or more peaks in the first set of peaks;

a device arranged and adapted to determine the area of one or more peaks in the first set of peaks and to filter out, attenuate or otherwise reject peaks in the first set of peaks which are determined to have an area less than a threshold area thereby reducing the first set of peaks to form a second reduced set of peaks; and a device arranged and adapted to convert the determined arrival time $T_0$ of one or more peaks in the second reduced set of peaks into a first arrival time $T_n$ and a second arrival time $T_{n+1}$ and/or to convert the determined intensity $S_o$ of one or more peaks in the second reduced set of peaks into a first intensity or area $S_n$ and a second intensity or area $S_{n+1}$.

According to an embodiment the apparatus preferably comprises an Analogue to Digital Converter or a transient recorder to digitise the first signal.

According to an embodiment:

(a) the Analogue to Digital Converter or transient recorder comprises a n-bit Analogue to Digital Converter or transient recorder, wherein n comprises 5, 6, 7, 8, 9, 10, 11, 12, 13, 14, 15, 16, 17, 18, 19, 20 or >20; and/or (b) the Analogue to Digital Converter or transient recorder has a sampling or acquisition rate selected from the group consisting of: (i) <1 GHz; (ii) 1-2 GHz; (iii) 2-3 GHz; (iv) 3-4 GHz; (v) 4-5 GHz; (vi) 5-6 GHz; (vii) 6-7 GHz; (viii) 7-8 GHz; (ix) 8-9 GHz; (x) 9-10 GHz; and (xi) >10 GHz; and/or (c) the Analogue to Digital Converter or transient recorder has a digitisation rate which is substantially uniform or non-uniform.

According to an aspect of the present invention there is provided a mass spectrometer comprising apparatus as described above.

According to an embodiment the apparatus preferably comprises:

(a) an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") on source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") or source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") on source; and (xx) a Glow Discharge ("GD") ion source; and/or (b) one or more continuous or pulsed ion sources; and/or (c) one or more ion guides; and/or (d) one or more ion mobility separation devices and/or one or more Field Asymmetric Ion Mobility Spectrometer devices; and/or (e) one or more ion traps or one or more ion trapping regions; and/or (f) one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("DID") fragmentation device; and/or (g) a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Eon Cyclotron Resonance ("FTICR") mass analyser; (ix) an electrostatic or orbitrap mass analyser; (x) a Fourier Transform electrostatic or orbitrap mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser; and/or (h) one or more energy analysers or electrostatic energy analysers; and/or (i) one or more ion detectors; and/or (j) one or more mass filters selected from the group consisting of: (i) a quadrupole mass filter; (ii) a 2D or linear quadrupole on trap; (iii) a Paul or 3D quadrupole ion trap; (iv) a Penning ion trap; (v) an ion trap; (vi) a magnetic sector mass filter; (vii) a Time of Flight mass filter; and (viii) a Wein filter; and/or (k) a device or ion gate for pulsing ions; and/or (l) a device for converting a substantially continuous on beam into a pulsed ion beam.

The mass spectrometer preferably further comprises either:

(i) a C-trap and an orbitrap mass analyser comprising an outer barrel-like electrode and a coaxial inner spindle-like electrode, wherein in a first mode of operation ions are transmitted to the C-trap and are then injected into the orbitrap mass analyser and wherein in a second mode of operation ions are transmitted to the C-trap and then to a collision cell or Electron Transfer Dissociation device wherein at least some, ions are fragmented into fragment ions, and wherein the fragment ions are then transmitted to the C-trap before being injected into the orbitrap mass analyser; and/or (ii) a stacked ring ion guide comprising a plurality of electrodes each having an aperture through which ions are transmitted in use and wherein the spacing of the electrodes increases along the length of the ion path, and wherein the apertures in the electrodes in, an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

According to an aspect of the present invention there is provided a method of mass spectrometry comprising:

digitising a first signal output from an ion detector to produce a first digitised signal;

detecting a first set of peaks in the first digitised signal and determining the arrival time $T_o$ or mass or mass to charge ratio $M_0$ and intensity $S_o$ of one or more peaks in the first set of peaks;

determining the area of one or more peaks in the first set of peaks and filtering out, attenuating or otherwise rejecting peaks in the first set of peaks which are determined to have an area less than a threshold area thereby reducing the first set of peaks to form a second reduced set of peaks; and converting the determined arrival time $T_0$ or mass or mass to charge ratio $M_0$ of one or more peaks in the second reduced set of peaks into a first mass or mass to charge ratio $M_n$ and a second mass or mass to charge ratio $M_{n+1}$ and/or converting the determined intensity $S_o$ of one or more peaks in the second reduced set of peaks into a first intensity or area $S_n$ and a second intensity or area $S_{n+1}$.

According to an aspect of the present invention there is provided a mass spectrometer comprising:

a device arranged and adapted to digitise a first signal output from an on detector to produce a first digitised signal;

a device arranged and adapted to detect a first set of peaks in the first digitised signal and to determine the arrival time $T_o$ or mass or mass to charge ratio $M_0$ and intensity $S_o$ of one or more peaks in the first set of peaks;

a device arranged and adapted to determine the area of one or more peaks in the first set of peaks and to filter out, attenuate or otherwise reject peaks in the first set of peaks which are determined to have an area less than a threshold area thereby reducing the first set of peaks to form a second reduced set of peaks; and a device arranged and adapted to convert the determined arrival time $T_0$ or mass or mass to charge ratio $M_0$ of one or more peaks in the second reduced set of peaks into a first mass or mass to charge ratio $M_n$ and a second mass or mass to charge ratio $M_{n+1}$ and/or to convert the determined intensity $S_o$ of one or more peaks in the second reduced set of peaks into a first intensity or area $S_n$ and a second intensity or area $S_{n+1}$.

According to an aspect of the present invention there is provided a computer program executable by the control system of a mass spectrometer, the computer program being arranged to cause the control system:

to digitise a first signal output from an ion detector to produce a first digitised signal;

to detect a first set of peaks in the first digitised signal and to determine the arrival time $T_o$ and peak area $S_o$ of one or more peaks in the first set of peaks thereby forming a first list of data pairs, each data pair comprising an arrival time value and a peak area value; and to filter out, attenuate or otherwise reject one or more data pairs from the first list thereby forming a second reduced list, wherein a data pair is filtered out, attenuated or otherwise rejected from the first list if the peak area value of a data pair in the first list is determined to be less than a threshold peak area.

According to an aspect of the present invention there is provided a computer readable medium comprising computer executable instructions stored on the computer readable medium, the instructions being arranged to be executable by a control system of a mass spectrometer, the computer program being arranged to cause the control system:

to digitise a first signal output from an ion detector to produce a first digitised signal;

to detect a first set of peaks in the first digitised signal and to determine the arrival time $T_o$ and peak area $S_o$ of one or more peaks in the first set of peaks thereby forming a first list of data pairs, each data pair comprising an arrival time value and a peak area value; and to filter out, attenuate or otherwise reject one or more data pairs from the first list thereby forming a second reduced list, wherein a data pair is filtered out, attenuated or otherwise rejected from the first list if the peak area value of a data pair in the first list is determined to be less than a threshold peak area.

The computer readable medium is preferably selected from the group consisting of: (i) a ROM; (ii) an EAROM; (iii) an EPROM; (iv) an EEPROM; (v) a flash memory; (vi) an optical disk; (vii) a RAM; and (viii) a hard disk drive.

According to an embodiment a continuum or composite time or mass spectrum is preferably provided. The method preferably further comprises determining or obtaining a second differential or second difference of the continuum or composite time or mass spectrum. The method preferably further comprises determining the arrival time or mass or mass to charge ratio of one or more ions or mass peaks from the second differential or second difference of the continuum or composite time or mass spectrum.

The step of determining the arrival time or mass or mass to charge ratio of one or more ions or mass peaks from the second differential of the continuum or composite time or mass spectrum preferably comprises determining one or more zero crossing points of the second differential of the continuum or composite time or mass spectrum.

The method preferably further comprises determining or setting a start point $M_{start}$ of a peak or mass peak as corresponding to a stepping interval which is immediately prior or subsequent to the point when the second differential of the continuum or composite time or mass spectrum falls below zero or another value.

The method preferably further comprises determining or setting an end point $M_{end}$ of a peak or mass peak as corresponding to a stepping interval which is immediately prior or subsequent to the point when the second differential of the continuum or composite time or mass spectrum rises above zero or another value.

According to an embodiment the method further comprises determining the intensity of peaks or mass peaks from the continuum or composite time or mass spectrum. The step of determining the intensity of peaks or mass peaks from the continuum or composite time or mass spectrum comprises determining the area of a peak or mass peak bounded by the start point $M_{start}$ and/or the end point $M_{end}$.

The method preferably further comprises determining the moment of peaks or mass peaks from the continuum or composite time or mass spectrum. According to an embodiment the step of determining the moment of peaks or mass peaks from the continuum or composite time or mass spectrum comprises determining the moment of a peak or mass peak, bounded by the start point $M_{start}$ and/or the end point $M_{end}$.

The method preferably further comprises determining the centroid time of peaks or mass peaks from the continuum or composite time or mass spectrum.

According to an embodiment the method further comprises determining the average or representative time or mass of peaks or mass peaks from the continuum or composite time or mass spectrum.

The method preferably further comprises converting time data into mass or mass to charge ratio data.

According to the preferred embodiment the method preferably further comprises displaying or outputting a mass spectrum. The mass spectrum preferably comprises a plurality of mass spectral data points wherein each data point is considered as representing a species of on and wherein each data point comprises an intensity value and a mass or mass to charge ratio value.

The on detector preferably comprises a microchannel plate, a photomultiplier or an electron multiplier device. The on detector preferably further comprises a current to voltage converter or amplifier for producing a voltage pulse in response to the arrival of one or more ions at the ion detector.

According to an embodiment a mass analyser is provided. The mass analyser preferably comprises: (i) a Time of Flight ("TOF") mass analyser; (ii) an orthogonal acceleration Time of Flight ("oaTOF") mass analyser; or (iii) an axial acceleration Time of Flight mass analyser. Alternatively, the mass analyser is selected from the group consisting of: (i) a magnetic sector mass spectrometer; (ii) a Paul or 3D quadrupole mass analyser; (iii) a 2D or linear quadrupole mass analyser; (iv) a Penning trap mass analyser; (v) an ion trap mass analyser; and (vi) a quadrupole mass analyser.

The apparatus preferably further comprises an Analogue to Digital Converter or a transient recorder to digitise the first signal. The Analogue to Digital Converter or transient recorder preferably comprises a n-bit Analogue to Digital Converter or transient recorder, wherein n comprises 8, 10, 12, 14 or 16. The Analogue to Digital Converter or transient recorder preferably has a sampling or acquisition rate selected from the group consisting of: (i) <1 GHz; (ii) 1-2 GHz; (iii) 2-3 GHz; (iv) 3-4 GHz; (v) 4-5 GHz; (vi) 5-6 GHz; (vii) 6-7 GHz; (viii) 7-8 GHz; (ix) 8-9 GHz; (x) 9-10 GHz; and (xi) >10 GHz.

The Analogue to Digital Converter or transient recorder preferably has a digitisation rate which is substantially uniform. Alternatively, the Analogue to Digital Converter or transient recorder may have a digitisation rate which is substantially non-uniform.

According to another aspect of the present invention there is provided a mass spectrometer comprising apparatus as described above.

The mass spectrometer may further comprise an ion source. The ion source is preferably selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") on source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") on source; (x) a Field Ionisation ("FI") on source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; and (xviii) a Thermospray ion source.

According to an embodiment the mass spectrometer may comprise a continuous or pulsed on source.

The mass spectrometer preferably further comprises a mass analyser. The mass analyser preferably comprises: (i) a Time of Flight ("TOF") mass analyser; (ii) an orthogonal acceleration Time of Flight ("oaTOF") mass analyser; or (iii) an axial acceleration Time of Flight mass analyser. Alternatively, the mass analyser may be selected from the group consisting of: (i) a magnetic sector mass spectrometer; (ii) a Paul or 3D quadrupole mass analyser; (iii) a 2D or linear quadrupole mass analyser; (iv) a Penning trap mass analyser; (v) an ion trap mass analyser; and (vi) a quadrupole mass analyser.

The mass spectrometer preferably further comprises a collision, fragmentation or reaction device. The collision, fragmentation or reaction device is preferably arranged to fragment ions by Collisional Induced Dissociation ("CID"). Alternatively, the collision, fragmentation or reaction device may be selected from the group consisting of: (i) a Surface Induced Dissociation ("SID") fragmentation device; (ii) an Electron Transfer Dissociation fragmentation device; (iii) an Electron Capture Dissociation fragmentation device; (iv) an Electron Collision or Impact Dissociation fragmentation device; (v) a Photo Induced Dissociation ("PID") fragmentation device; (vi) a Laser Induced Dissociation fragmentation device; (vii) an infrared radiation induced dissociation device; (viii) an ultraviolet radiation induced dissociation device; (ix) a nozzle-skimmer interface fragmentation device; (x) an in-source fragmentation device; (xi) an ion-source Collision Induced Dissociation fragmentation device; (xii) a thermal or temperature source fragmentation device; (xiii) an electric field induced fragmentation device; (xiv) a magnetic field induced fragmentation device; (xv) an enzyme digestion or enzyme degradation fragmentation device; (xvi) an ion-ion reaction fragmentation device; (xvii) an ion-molecule reaction fragmentation device; (xviii) an ion-atom reaction fragmentation device; (xix) an ion-metastable ion reaction fragmentation device; (xx) an ion-metastable molecule reaction fragmentation device; (xxi) an ion-metastable atom reaction fragmentation device; (xxii) an ion-ion reaction device for reacting ions to form adduct or product ions; (xxiii) an ion-molecule reaction device for reacting ions to form adduct or product ions; (xxiv) an ion-atom reaction device for reacting ions to form adduct or product ions; (xxv) an ion-metastable ion reaction device for reacting ions to form adduct or product ions; (xxvi) an ion-metastable molecule reaction device for reacting ions to form adduct or product ions; and (xxvii) an ion-metastable atom reaction device for reacting ions to form adduct or product ions.

According, to a preferred embodiment of the present invention multiple time of flight spectra are preferably acquired by a Time of Flight mass analyser which preferably comprises an ion detector which incorporates an Analogue to Digital Converter. Detected ion signals are preferably amplified and converted into a voltage signal. The voltage signal is then preferably digitised using a fast Analogue to Digital Converter. The digitised signal is then preferably processed.

The start time of discrete voltage peaks present in the digitised signal which correspond to one or more ions arriving at the on detector are preferably determined. Similarly, the end time of each discrete voltage peak is also preferably determined. The intensity and moment of each discrete voltage peak is then preferably determined. The determined start time and/or end time of each voltage peak, the intensity of each voltage peak and the moment of each voltage peak are preferably used or stored for further processing.

Data from subsequent acquisitions is preferably processed in a similar manner. Once multiple acquisitions have been performed the data from multiple acquisitions is preferably combined and a histogram of ion arrival times and corresponding intensity values relating to ion arrival events is preferably formed, created or compiled. The times and corresponding intensity values from multiple acquisitions are then preferably integrated so as to form a continuous, composite or continuum spectrum or mass spectrum.

The continuous, composite or continuum spectrum or mass spectrum is preferably further processed. The intensity and time of flight, mass or mass to charge ratio of peaks or mass peaks present in the continuous, composite or continuum spectrum or mass spectrum is preferably determined. A mass spectrum comprising the mass to charge ratio of ions and corresponding intensity values is then preferably generated.

According to the preferred embodiment a second differential of the on or voltage signal which is preferably output from the ion detector is preferably determined. The start time of voltage peaks present in the ion or voltage signal is preferably determined as being the time when the second differential of the digitised signal falls below zero. Similarly, the end time of voltage peaks is preferably determined as being the time when the second differential of the digitised signal rises above zero.

According to a less preferred embodiment the start time of a voltage peak may be determined as being the time when the digitised signal rises above a pre-defined threshold value. Similarly, the end time of a voltage peak may be determined as being the time when the digitised signal subsequently falls below a pre-defined threshold value.

The intensity of a voltage peak is preferably determined from the sum of all digitised measurements bounded by the determined start time of the voltage peak and ending with the determined end time of the voltage peak.

The moment of the voltage peak is preferably determined from the sum of the product of each digitised measurement and the number of digitisation time intervals between the digitised measurement and the start time of the voltage peak, or the end time of the voltage peak, for all digitised measurements bounded by the start time and the end time of the voltage peak.

Alternatively, the moment of a voltage peak may be determined from the sum of the running intensity of the voltage peak as the peak intensity is progressively computed, time interval by time interval, by the addition of each successive digitisation measurement, from the start time of the voltage peak to the end time of the voltage peak.

The start time and/or the end time of each voltage peak, the intensity of each voltage peak and the moment of each voltage peak from each acquisition are preferably recorded and are preferably used.

The start time and/or the end time of a voltage peak, the intensity of the voltage peak and the moment of the voltage peak are preferably used to calculate a representative or average time of flight for the one or more ions detected by the ion detector. The representative or average time of flight may then preferably be recorded or stored for further processing.

The representative or average time of flight for the one or more ions may be determined by dividing the moment of the voltage peak by the intensity of the voltage peak in order to determine the centroid time of the voltage peak. The centroid time of the voltage peak may then be added to the start time of the voltage peak, or may be subtracted from the end time of the voltage peak, as appropriate. Advantageously, the representative or average time of flight may be calculated to a higher precision than that of the digitisation time interval.

The representative or average time of flight and the corresponding intensity value associated with each voltage peak from each acquisition is preferably stored. Data from multiple acquisitions is then preferably assembled or combined into a single data set comprising time and corresponding intensity values.

The single data set comprising representative or average time of flight and corresponding intensity values from multiple acquisitions is then preferably processed such that the data is preferably integrated to form a single continuous, composite or continuum mass spectrum. According to an embodiment the time and intensity pairs may be integrated using an integrating algorithm. The data may according to an embodiment be integrated by one or more passes of a box car integrator, a moving average algorithm, or another integrating algorithm.

The resultant single continuous, composite or continuum spectrum or mass spectrum preferably comprises a continuum of intensities at uniform or non-uniform time, mass or mass to charge ratio intervals. If the single continuous, composite or continuum spectrum or mass spectrum comprises a continuum of intensities at uniform time intervals then these time intervals may or may not correspond with a simple fraction or integral multiple of the digitisation time intervals of the Analogue to Digital Converter.

According to the preferred embodiment the frequency of intensity data intervals is preferably such that the number of intensity data intervals across a peak or mass peak is greater than four, more preferably greater than eight. According to an embodiment the number of intensity data intervals across a peak or mass peak may be sixteen or more.

The resultant single continuous, composite or continuum spectrum or mass spectrum may then be further processed such that the data or mass spectral data is preferably reduced to time of flight, mass or mass to charge ratio values corresponding intensity values.

According to the preferred embodiment the single continuous, composite or continuum spectrum or mass spectrum is preferably processed in a similar manner to the way that the voltage signal from each acquisition is preferably processed in order to reduce the continuous or continuum spectrum or mass spectrum to a plurality of time of flight and associated intensity values. A discrete mass spectrum may be produced or output.

According to the preferred embodiment the start time or point of each peak, mass or data peak observed in the continuum or composite spectrum or mass spectrum is preferably determined. Similarly, the end time or point of each peak, mass or data peak is also preferably determined. The intensity of each peak, mass or data peak is then preferably obtained. The moment of each peak, mass or data peak is also preferably obtained. The time of flight of each peak, mass or data peak is preferably obtained from the start time or point of the peak, mass or data peak and/or the end time or point of the peak, mass or data peak, the data peak composite intensity and the composite moment of the peak, mass or data peak.

The start time or point of a peak, mass or data peak may be determined as being the time when the continuous, composite or continuum spectrum or mass spectrum rises above a pre-defined threshold value. The subsequent end time or point of a peak, mass or data peak may be determined as being the time when the continuous, composite or continuum spectrum or mass spectrum falls below a pre-defined threshold value.

Alternatively, the start time or point of a peak, mass or data peak may be determined as being the time or point when the second differential of the continuous, composite or continuum spectrum or mass spectrum falls below zero or another value. Similarly, the end time or point of a peak, mass or data peak may be determined as being the time or point when the second differential of the continuous, composite or continuum spectrum or mass spectrum subsequently rises above zero or another value.

The composite intensity of a peak, mass or data peak may be determined from the sum of the intensities of all the mass or data points bounded by the start time or point of the peak, mass or data peak and the end time or point of the peak, mass or data peak.

A composite moment of each peak, mass or data peak is preferably determined from the sum of the product of each mass or data point intensity and the time difference between the mass or data peak time of flight and the start time or point or end time or point, for all mass or data point bounded by the start time or point and the end time or point of the mass or data peak.

The time of flight of a peak, data or mass peak may be determined from dividing the composite moment of the peak, mass or data peak by the composite intensity of the peak, mass or data peak to determine the centroid time of the peak, mass or data peak. The centroid time of a peak, mass or data peak is then preferably added to the start time or point of the peak, mass or data peak, or is subtracted from the end time or point of the peak, mass or data peak, as appropriate. The time of flight of the peak, mass or data peak may be calculated to a higher precision than that of a digitisation time interval and to a higher precision than that of each peak, mass or data peak.

The set of times of flight of peak, mass or data peaks and corresponding intensity values may then be converted into a set of mass or mass to charge ratio values and corresponding intensity values. The conversion of time of flight data to mass or mass to charge ratio data may be performed by converting the data using a relationship derived from a calibration procedure and as such is well known in the art.

BRIEF DESCRIPTION OF THE DRAWINGS

Various embodiments of the present invention together with other arrangements given for illustrative purposes only will now be described, by way of example only, and with reference to the accompanying drawings in which.

DETAILED DESCRIPTION OF THE PREFERRED EMBODIMENTS

Figure 1:
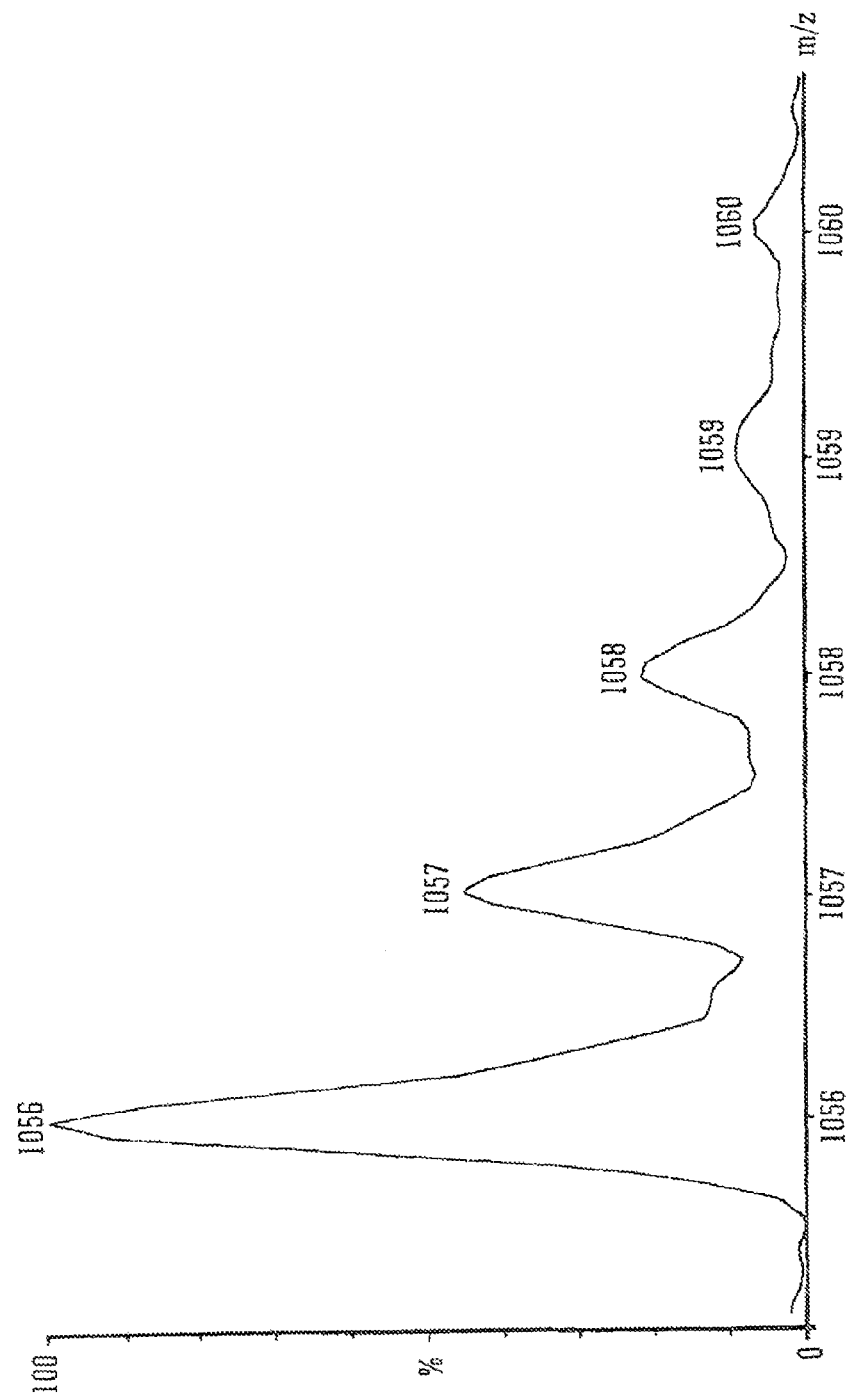
FIG. 1 shows a portion of a raw unprocessed composite mass spectrum of polyethylene glycol as acquired by ionising a sample using a MALDI ion source and mass analysing the resulting ions using an orthogonal acceleration Time of Flight mass analyser.

According to an embodiment of the present invention a Time of Flight mass analyser is preferably provided which preferably comprises a detector system incorporating an Analogue to Digital Converter rather than a conventional Time to Digital Converter. Ions are preferably mass analysed by the Time of Flight mass analyser and the ions are preferably detected by an ion detector. The ion detector preferably comprises a microchannel plate (MCP) electron multiplier assembly. A current to voltage converter or amplifier is preferably provided which preferably produces a voltage pulse or signal in response to a pulse of electrons being output from the microchannel plate ion detector. The voltage pulse or signal in response to the arrival of a single ion at the ion detector preferably has a width of between 1 and 3 ns at half height.

The voltage pulse or signal resulting from the arrival of one or more ions at the ion detector of the Time of Flight mass analyser is preferably digitised using, for example, a fast 8-bit transient recorder or Analogue to Digital Converter (ADC). The sampling rate of the transient recorder or Analogue to Digital Converter is preferably 1 GHz or faster.

The voltage pulse or signal may be subjected to signal thresholding wherein a constant number or value is preferably subtracted from each output number from the Analogue to Digital Converter in order to remove the majority of any Analogue to Digital Converter noise. If the signal becomes negative following subtraction of the constant number or value then that portion of the signal is preferably reset to zero.

Determining the Start and End Times of Voltage Peaks

A smoothing algorithm such as a moving average or boxcar integrator algorithm may be applied to a spectrum output from the Analogue to Digital Converter. Alternatively, a Savitsky Golay algorithm, a Hites Biemann algorithm or another type of smoothing algorithm may be applied to the data. For example, a single pass of a moving average with a window of three digitisation intervals is given by:

$$s(i)=m(i-1)+m(i)+m(i+1) \tag{1}$$

wherein m(i) is the intensity value in bits recorded in Analogue to Digital Converter time bin i and s(i) is the result of the smoothing procedure.

Multiple passes of a smoothing algorithm may be applied to the data.

Once the raw time of flight ADC data has been smoothed, a second differential or second difference of the preferably smoothed data may then be obtained or determined in order to detect the presence of any ion arrival events or peaks.

The zero crossing points of the second differential are preferably determined and are preferably used to indicate or determine the start time and the end time of each observed voltage peak or ion signal peak. This method of peak location is particularly advantageous if the noise level is not constant throughout the time of flight spectrum or if the noise level fluctuates between individual time of flight spectra.

A simple difference calculation with a moving window of three digitisation intervals will produce a first differential of the digitised signal D1(i) which can be expressed by the equation:

$$D1(i)=s(i+1)-s(i-1) \tag{2}$$

wherein s(i) is the result of any smoothing procedure entered for time bin i.

The difference calculation may then preferably be repeated, with a moving window of three digitisation intervals. Accordingly, the second differential D2(i) of the first differential D1(i) will be produced. This may be expressed by the equation:

$$D2(i)=D1(i+1)-D1(i-1) \tag{3}$$

The second differential may therefore be expressed by the equation:

$$D2(i)=s(i+2)-2.s(i)+s(i-2) \tag{4}$$

This difference calculation may be performed with a different width of moving window. The width of the difference window relative to that of the voltage pulse width at half height is preferably between 33% and 100%, and more preferably about 67%.

The second differential D2(i) is preferably integrated to locate or determine the start and end times of observed voltage peaks. The start time t1 of a voltage peak may be taken to be the digitisation interval immediately after the second differential falls below zero. The end time t2 of the voltage peak may be taken to be the digitisation interval immediately before the second differential rises above zero. Alternatively, the start time t1 of a voltage peak may be taken to be the digitisation interval immediately before the second differential falls below zero and the end time t2 of the voltage peak may be taken to be the digitisation interval immediately after the second differential rises above zero.

According to a less preferred embodiment the voltage peak start time t1 may be derived from the digitisation time when the value of the Analogue to Digital Converter output m(i) rises above a threshold level. Similarly, the voltage peak end time t2 may be derived from the digitisation time when the value of the Analogue to Digital Converter output m(i) falls below a threshold level.

Determining the Intensity and Moment of each Voltage Peak

Once the start and the end times of a voltage peak or ion signal peak have been determined, the intensity and moment of the voltage peak or ion signal peak bounded by the start and end times are preferably determined.

The peak intensity of the voltage or ion signal preferably corresponds to the area of the peak or signal and is preferably described by the following equation:

$$I = \sum_{i=t1}^{i=t2} m_i \tag{5}$$

wherein I is the determined voltage peak intensity, $m_i$ is the intensity value in bits recorded in Analogue to Digital Converter time bin i, t1 is the number of the Analogue to Digital Converter digitisation time bin corresponding to the start of the voltage peak and t2 is the number of the Analogue to Digital Converter digitisation time bin corresponding to the end of the voltage peak.

The moment $M_1$ with respect to the start of the voltage peak is preferably described by the following equation:

$$M_1 = \sum_{i=t1}^{i=t2} m_i \cdot i \tag{6}$$

The moment $M_2$ with respect to the end of the voltage peak is preferably described by the following equation:

$$M_2 = \sum_{i=t1}^{i=t2} m_i \cdot (\delta t - i + 1) \tag{7}$$

where:

$$\delta t = t2 - t1 \tag{8}$$

The calculation of the moment $M_2$ with respect to the end of the peak is of particular interest. It may alternatively be calculated using the following equation:

$$M_2 = \sum_{i} \sum_{i=t1}^{i=t2} m_i \tag{9}$$

This latter equation presents the computation in a form that is very fast to execute. It may be rewritten in the form:

$$M_2 = \sum_{i=t1}^{i=t2} I_i \tag{10}$$

wherein $I_i$ is the intensity calculated at each stage in executing Eqn. 5.

The moment can therefore be computed as the intensity is being computed. The moment is preferably obtained by summing the running total for the intensity at each stage in computing the intensity.

Calculations of this sort may according to an embodiment be performed very rapidly using Field Programmable Gate Arrays (FPGAs) in which calculations on large arrays of data may be performed in an essentially parallel fashion.

The calculated intensity and moment values and the number of the time bin corresponding to the start time and/or the end time of the voltage peak or ion signal are preferably recorded for further processing.

Determining the Centroid Time of Flight Value for each Voltage Peak

The centroid time $C_1$ of the voltage peak with respect to the start of the peak may be calculated by dividing the moment of the voltage peak by the area or intensity of the voltage peak:

$$C_1 = \frac{M_1}{I} \tag{11}$$

If the time bin recorded as the start of the voltage peak is t1, then the representative or average time t associated with the voltage peak is:

$$t = t1 + C_1 \tag{12}$$

On the other hand, the centroid time $C_2$ of the voltage peak with respect to the end of the peak may be calculated from:

$$C_2 = \frac{M_2}{I} \tag{13}$$

If the time bin recorded as the end of the voltage peak is t2, then the representative or average time t associated with the voltage peak is:

$$t = t2 - C_2 \tag{14}$$

The precision of the calculated value of t is dependent upon the precision of the division computed in Eqns. 11 or 13. The division calculation is relatively slow compared to the other calculations in this procedure and hence the higher the required precision the longer the calculation takes.

According to an embodiment the start and end times t1, t2 of each voltage peak in a spectrum, the corresponding intensity I and the calculated moments $M_1$ or $M_2$ are preferably recorded. The corresponding ion arrival time(s) t may be calculated off line. This approach allows t to be computed to whatever precision is required. Alternatively, the value of t may be calculated in real time.

According to the preferred embodiment the arrival time and area for each ion signal is converted into two separate arrival times and corresponding areas. The two arrival times are preferably stored in two neighbouring locations in an array of memory locations corresponding to predetermined time intervals subdividing the spectrum. The two locations in which the two areas are stored are preferably those having predetermined times that fall immediately before and immediately after the originally determined arrival time. The values of the areas stored in each of these two locations are preferably calculated such that: (i) the sum of the two areas is preferably equal to the originally determined area or intensity; and (ii) the weighted average arrival time that would be calculated from these two pairs of time locations and areas is preferably the same as that originally determined.

Figure 8:
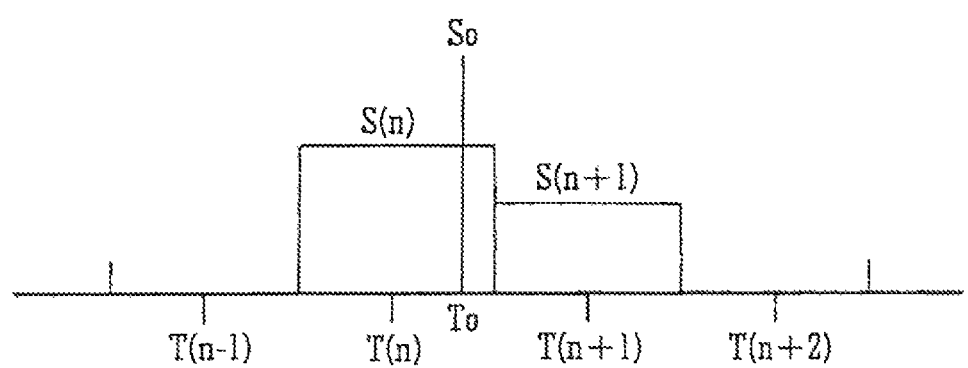
FIG. 8 shows how according to the preferred embodiment a time and intensity value is converted into two intensity values which are added to adjacent time bins.

The calculation of the two areas is illustrated in FIG. 8. An array of memory locations is shown having predetermined assigned times or central times which correspond to $\ldots T_{(n-1)}$, $T_{(n)}$, $T_{(n+1)}$, $T_{(n+2)} \ldots$.

An ion event may be assumed to be detected and is determined to have a centroid time of To and an area or intensity of So. It is also assumed that $T_{(n)} < To < T_{(n+1)}$. According to the preferred embodiment two new areas $S_{(n)}$ and $S_{(n+1)}$ are preferably calculated and added to time locations or time bins having assigned times of $T_{(n)}$ and $T_{(n+1)}$ where:

$$S_{(n)} + S_{(n+1)} = So$$

$$S_{(n)} \cdot T_{(n)} + S_{(n+1)} \cdot T_{(n+1)} = So \cdot To.$$

Therefore:

$$S_{(n)} = So \cdot (T_{(n+1)} - To)/(T_{(n+1)} - T_{(n)})$$

$$S_{(n+1)} = So - S_{(n)}$$

The precision of the original data is preferably preserved according to the preferred embodiment.

Storing the Ion Arrival Times and Corresponding Intensity Values in an Array of Memory Locations A single time of flight spectrum may comprise several voltage peaks due to a number of ions arriving at the detector. Each voltage peak is preferably analysed and converted into a time value and a corresponding intensity value. The time and intensity values for each voltage peak are preferably converted into pairs of time values and corresponding areas. The values are preferably stored in adjacent or neighbouring elements of an array of memory locations. The array of memory locations preferably correspond or relate to predetermined time intervals or subdivisions of the time of flight spectrum. For example, a time of flight spectrum may have a duration of 100 μs and the spectrum may be sub-divided into an array of 500,000 equal time intervals. Each time interval or subdivision will have a width or duration of 200 ps.

Further Processing of the Composite Time and Intensity Data

Subsequent time of flight spectra are preferably obtained and processed in a similar manner to that described above i.e. the spectra are preferably analysed and time and intensity values corresponding to an ion arrival event are preferably determined. A histogram of time and intensity values is then preferably built up as each time and intensity value is converted into a pair of intensity values which occupy adjacent time bins.

According to an embodiment the histogram of time and intensity values may be further processed by applying a smoothing function to the data so that a continuum spectrum is provided. The preferably smoothed data is then preferably subject to peak detection and peak centroid calculations in a similar manner to that discussed above. Accordingly, a second differential or second difference of the continuum spectrum is preferably obtained and the start and end times of peaks are determined. The intensity and centroid times of each peak are preferably determined. The width and increment used in the smoothing and double difference calculations may be unrelated to the digitisation rate of the ADC.

According to the preferred embodiment the intensity and time of flight values resulting from multiple spectra are preferably assembled into a single histogram. The composite set of data is then preferably processed using, for example, a moving average or boxcar integrator algorithm. The moving window preferably has a width in time of W(t) and the increment in time by which the window is stepped is preferably S(t). Both W(t) and S(t) may be assigned values which are completely independent of each other and completely independent of the Analogue to Digital Converter digitisation interval. Both W(t) and S(t) may have constant values or may be a variable function of time.

According to the preferred embodiment, the width of the integration window W(t) relative to the width of the peak or mass peak at half height is preferably between 33% and 100%, and more preferably about 67%. The step interval S(t) is preferably such that the number of steps across the mass peak is at least four, or more preferably at least eight, and even more preferably sixteen or more.

Intensity data within each window is preferably summed and each intensity sum is preferably recorded along with the time interval corresponding to the step at which the sum is computed.

If n is the number of steps of the stepping interval S(t) for which the time is T(n), the sum G(n) from the first pass of a simple moving average or boxcar integrator algorithm is given by:

$$G(n) = \sum_{t=T(n)-0.5 \cdot W(T)}^{t=T(n)+0.5 \cdot W(T)} I(t) \qquad (17)$$

wherein T(n) is the time after n steps of the stepping interval S(t), I(t) is the intensity of a voltage peak recorded with an average or representative time of flight t, W(T) is the width of the integration window at time T(n), and G(n) is the sum of all voltage peak intensities with a time of flight within the integration window W(T) centered about time T(n).

According to an embodiment multiple passes of the integration algorithm may be applied to the data. A smooth continuum composite data set is then preferably provided. The resulting continuum composite data set or continuum mass spectrum may then preferably be further analysed.

Analysing the Composite Continuum Spectrum or Mass Spectrum

The peak centroid times and intensities calculated from the data are preferably stored and represent the composite spectrum for all the acquired data.

According to this method the precision of each individual measurement is preferably retained whilst enabling the amount of data to be compressed thereby decreasing the processing requirements.

According to the preferred embodiment the histogram of intensity and corresponding time of flight is preferably converted into mass spectral data comprising mass or mass to charge ratio values and intensity so that a mass spectrum is preferably produced.

According to the preferred embodiment a second differential or second difference of the smooth continuum composite data set or continuum mass spectrum is preferably determined.

The zero crossing points of the second differential of the continuum spectrum or mass spectrum are preferably determined. The zero crossing points of the second differential indicate the start time and the end time of mass peaks in the composite continuum data set or mass spectrum.

The first and second differentials can be determined by two successive difference calculations. For example, a difference calculation with a moving window of 3 step intervals which will produce a first differential H1(n) of the continuum data G and may be expressed by the equation:

$$H1(n)=G(n+1)-G(n-1) \qquad (18)$$

wherein G(n) is the final sum of one or more passes of the integration algorithm at step n.

If this simple difference calculation is repeated, again with a moving window of 3 digitisation intervals, this will produce a second differential H2(n) of the first differential H1(n). This may be expressed by the equation:

$$H2(i)=H1(i+1)-H1(i-1) \qquad (19)$$

The combination of the two difference calculations may be expressed by the equation:

$$H2(n)=G(n+2)-2 \cdot G(n)+G(n-2) \qquad (20)$$

This difference calculation may be performed with a different width of moving window. The width of the difference window relative to that of the mass peak width at half height is preferably between 33% and 100%, and more preferably about 67%.

The second differential H2(n) is preferably used to locate the start and end times of peaks or mass peaks observed in the continuum spectrum or mass spectrum. The start time T1 of a peak or mass peak is preferably the stepping interval after which the second differential falls below zero. The end time T2 of a peak or mass peak is preferably the stepping interval before which the second differential rises above zero. Alternatively, the start time T1 of a peak or mass peak may be the stepping interval before which the second differential falls below zero and the end time T2 of the peak or mass peak may be the stepping interval after which the second differential rises above zero.

According to another embodiment the start time T1 of the peak or mass peak may be interpolated from the stepping intervals before and after the second differential falls below zero, and the end time T2 of the peak may be interpolated from the stepping interval before and after the second differential rises above zero.

According to a less preferred embodiment the peak or mass peak start time T1 and the peak or mass peak end time T2 may be derived from the stepping times for which the value of the integration procedure output G rises above a threshold level and subsequently falls below a threshold level.

Once the start time and the end time of a peak or mass peak have been determined, values corresponding to the intensity and moment of the peak or mass peak within the bounded region are preferably determined. The intensity and moment of the peak or mass peak are preferably determined from the intensities and time of flights of the peak or mass peaks bounded by the mass peak start time and the peak or mass peak end time.

The peak or mass peak intensity corresponds to the sum of the intensity values bounded by the peak or mass peak start time and the peak or mass peak end time, and may be described by the following equation:

$$A = \sum_{t=T1}^{t=T2} I_t \quad (21)$$

wherein A is the peak or mass peak intensity, $I_t$ is the intensity of the peak or mass peak with time of flight t, T1 is the start time of the peak or mass peak and T2 is the end time of the peak or mass peak.

The moment of each peak or mass peak is preferably determined from the sum of the moments of all the peak or mass peaks bounded by the peak or mass peak start time and the peak or mass peak end time.

The moment $B_1$ of the peak or mass peak with respect to the start of the peak is preferably determined from the intensity and time difference of each peak or mass peak with respect to the peak or mass peak start time and is preferably given by the following equation:

$$B_1 = \sum_{t=T1}^{t=T2} I_t \cdot (t - T1) \quad (22)$$

The moment $B_2$ with respect to the peak or mass peak end time is preferably given by the following equation:

$$B_2 = \sum_{t=T1}^{t=T2} I_t \cdot (T2 - t) \quad (23)$$

There is no particular advantage to be gained by calculating the moment $B_2$ with respect to the peak or mass peak end time as opposed to calculating the moment $B_1$ with respect to the start of the peak or mass peak.

The representative or average time Tpk associated with the peak or mass peak is given by:

$$Tpk = \left(T1 + \frac{B_1}{A}\right) = \left(T2 - \frac{B_2}{A}\right) \quad (24)$$

The precision of the calculated value of Tpk is dependent on the precision of the division computed in Eqn. 24 and may be computed to whatever precision is required.

Converting Time of Flight Data into Mass Spectral Data

The values Tpk and A for each peak or mass peak are preferably stored as a list within a computer memory. The list of peaks or mass peaks may be assigned masses or mass to charge ratios using their time of flights and a relationship between time of flight and mass derived from a calibration procedure. Such calibration procedures are well known in the art.

The simplest form of a time to mass relationship for a Time of Flight mass spectrometer is given below:

$$M = k \cdot (t + t^*)^2 \quad (25)$$

wherein t* is an instrumental parameter equivalent to an offset in irk flight time, k is a constant and M is the mass to charge ratio at time t.

More complex calibration algorithms may be applied to the data. For example, the calibration procedures disclosed in GB-2401721 (Micromass) or GB-2405991 (Micromass) may be used.

Alternative Embodiment wherein Time of Flight Data is Initially Converted into Mass Spectral Data According to an alternative embodiment the time of flight values associated with each voltage peak may initially be converted to mass or mass to charge ratio values using the time to mass relationship as described above in Eqn. 25. The mass or mass to charge ratios and corresponding intensity values are preferably stored in an array of memory locations which preferably correspond or relate to predetermined intervals or subdivisions of a mass spectrum.

The procedure described above of converting a time and intensity value into two areas in neighbouring time bins is now preferably modified to converting a mass or mass to charge ratio value into two areas in neighbouring mass or mass to charge ratio bins. A single composite mass spectrum or histogram is therefore preferably formed from the outset rather than a histogram of time and intensity values which are then converted into a mass spectrum at a final stage in the process.

The integration window W(m) and/or the stepping interval S(m) may each be set to be constant values or functions of mass. For example, the stepping interval function S(m) may be set such as to give a substantially constant number of steps over each mass spectral peak.

This method has several advantages over other known methods. The precision and accuracy of the measurement is preferably improved relative to other arrangements which may use a simple measurement of the maxima or apex of the signal. This is a result of using substantially the entire signal recorded within the measurement as opposed to just measuring at or local to the apex. The preferred method also gives an accurate representation of the mean time of arrival when the on signal is asymmetrical due to two or more ions arriving at substantially similar times. Signal maxima measurements will no longer reflect the mean arrival time or relative intensity of these signals.

The value of time t associated with each detected ion signal may be calculated with a precision higher than the original precision imposed by the digitisation rate of the Analogue to Digital Converter. For example, for a voltage peak width at half height of 2.5 ns, and an Analogue to Digital Converter digitisation rate of 2 GHz the time of flight may typically be calculated to a precision of ±125 ps or better.

According to this embodiment time data is preferably initially converted to mass or mass to charge ratio data. A combine algorithm is then preferably used which preferably operates on the mass or mass to charge ratio data.

According to this embodiment the arrival time calculated for each ion signal is preferably initially squared. Values associated with ion arrivals are therefore now related directly to the mass or mass to charge ratio of the ions. The mass or mass to charge ratio value may also be multiplied by a factor to convert the mass or mass to charge ratio to nominal mass.

The mass or mass to charge ratio value and area (i.e. intensity) calculated for each ion signal is preferably stored in one of an array of memory locations corresponding to predetermined mass or mass to charge ratio intervals which preferably subdivide the spectrum. For example, the mass or mass to charge ratio value and corresponding area may be stored in an array having intervals of $1/256$ mass units.

The procedure described above is preferably repeated for the required number of time of flight spectra so that a final composite histogram of mass or mass to charge ratio values and corresponding intensity values is preferably produced.

The composite mass or mass to charge ratio data may then be further processed by application of a smoothing function to provide a continuum mass spectrum. Peak detection and peak centroid calculations are then preferably calculated based upon the continuum mass spectrum in a manner substantially as described above. The detected and measured peaks preferably correspond to individual mass peaks. The width and increment used in the smoothing and double difference calculations is preferably in units of mass or mass to charge ratio and is preferably unrelated to the digitisation rate of the ADC.

The peak centroid mass or mass to charge ratios and corresponding intensities of the mass peaks are preferably stored and represent the composite spectrum for all the acquired data.

According to this embodiment each ion arrival time is converted to mass or mass to charge ratio directly after initial detection.

Subtracting Background Peaks

According to an embodiment the process of combining time or mass data falling within the same time or mass interval, subdivision or memory array element may use up to three scan ranges and a background factor. The first range (Average) preferably defines the range of scans across the chromatogram peak top that are to be averaged together to form a representative spectrum for the compound of interest.

Either one or two other ranges (Subtract) may be used to define a range of scans from the background of the chromatogram on each side of the peak. These scans are preferably averaged together to form a representative background spectrum.

Finally, the background spectrum intensities may be multiplied by the background factor (X) and may then be subtracted from the averaged peak-top spectrum to form the combine spectrum.

The combine process preferably has three stages. The first stage is to divide the mass scale and to separately merge spectra in both the Average and Subtract ranges thereby forming the merged average spectrum and the merged subtract spectrum. The second stage is to perform the subtraction and to form the merged result spectrum. The third stage is to reform the mass scale.

In the first and third stages, peak masses and intensities are preferably computed based on the following equations:

$$MassCurr = ((MassCurr*IntCurr) + (MassNew*IntNew))/(IntCurr+IntNew)$$

$$IntCurr = IntCurr + IntNew$$

wherein MassCurr is the current adjusted mass, MassNew is the new mass, IntCurr is the current adjusted intensity and IntNew is the new intensity.

According to the first stage, the mass range may be divided up, for example, into 0.0625 amu width mass windows which are preferably centred on nominal mass. Accordingly, the mass range between 41.00 and 42.00 would be divided up using the following boundaries:

| |
|---|
| 40.96875 |
| 41.03125 |
| 41.09375 |
| 41.15625 |
| 41.21875 |
| 41.28125 |
| 41.34375 |
| 41.40625 |
| 41.46875 |
| 41.53125 |
| 41.59375 |
| 41.65625 |
| 41.71875 |
| 41.78125 |
| 41.84375 |
| 41.90625 |
| 41.96875 |
| 42.03125 |

Using all scans in turn in the Average range, each peak mass is then preferably allocated to one of these mass windows. If there is already a peak or a merger of peaks in a particular mass window, then the peak preferably has its mass (MassNew) and intensity (IntNew) values merged with the current values (MassCurr,IntCurr) to form new current values.

For example, adding a peak with a mass of 44.5791 and intensity 1671 to a mass window which contains data having a current mass 44.5635 and current intensity 1556 would initiate the following merger:

$$MassCurr = ((44.5635*1556) + (44.5791*1671))/(1556+1671)$$
$$= 44.5716$$

$$IntCurr = 1556 + 1671 = 3227$$

When all peaks of all scans in the Average range have been processed, the intensities (IntCurr) in each window are then preferably divided by the total number of scans in the Average range to form the merged average spectrum.

The same process is then preferably performed using all scans in the Subtract range. The final intensities, are preferably divided by the total number of scans in the Subtract range. If there are two Subtract ranges then the final intensities are preferably divided by the total number of scans in both ranges.

All intensity values are preferably multiplied by the magnification factor (X) to create a merged subtract spectrum.

Embodiments of the Present Invention

An aspect of the preferred embodiment of the present invention is that the voltage peak times may be stored with a precision which is substantially higher than that afforded by the ADC digitisation intervals or a simple fraction of the ADC digitisation intervals.

According to one embodiment the data may be processed so as to result in a final spectrum wherein the number of step intervals over each mass spectral peak (ion arrival envelope) is substantially constant, it is known that for time of flight spectra recorded using a constant digitisation interval or which are constructed from many time of flight spectra using a histogramming technique with constant bin widths, the number of points per mass peak (ion arrival envelope) increases with mass. This effect can complicate further processing and can lead to an unnecessary increase in the amount of data to be stored. According to this embodiment there are no constraints over the choice of stepping interval and the stepping interval function may be set to obtain a constant number of steps across each mass peak.

The following analysis illustrates an example of such a stepping interval function. Apart from at low mass to charge ratio values, the resolution R of an orthogonal acceleration Time of Flight mass spectrometer is approximately constant with mass to charge ratio:

$$R = \frac{t}{2\Delta t} \quad (28)$$

wherein R is the mass resolution, t is the time of flight of the mass peak and $\Delta t$ is the width of the ion arrival envelope forming the mass peak.

Where the resolution is approximately constant, the peak width is proportional to the time of flight t:

$$\Delta t = \frac{t}{2R} \quad (29)$$

Accordingly, in order to obtain an approximately constant number of steps across a mass peak, the step interval S(t) needs to increase approximately in proportion to the time of flight t.

For mass spectrometers where there is a more complex relationship between resolution and mass it may be desirable to use a more complex function relating the stepping intervals S(t) and time of flight t.

Aspects of an embodiment of the present invention will now be illustrated with reference to FIGS. 1-8.

FIG. 1 shows a portion of a mass spectrum obtained from mass analysing a sample of polyethylene glycol. The sample was ionised using a Matrix Assisted Laser Desorption Ionisation (MALDI) ion source. The mass spectrum was acquired using an orthogonal acceleration Time of Flight mass analyser. The mass spectrum shown in FIG. 1 is the result of combining or summing 48 individual time of flight spectra which were generated by firing the laser 48 times i.e. 48 separate acquisitions were obtained. The spectra were acquired or recorded using a 2 GHz 8-bit Analogue to Digital Converter.

Figure 2:
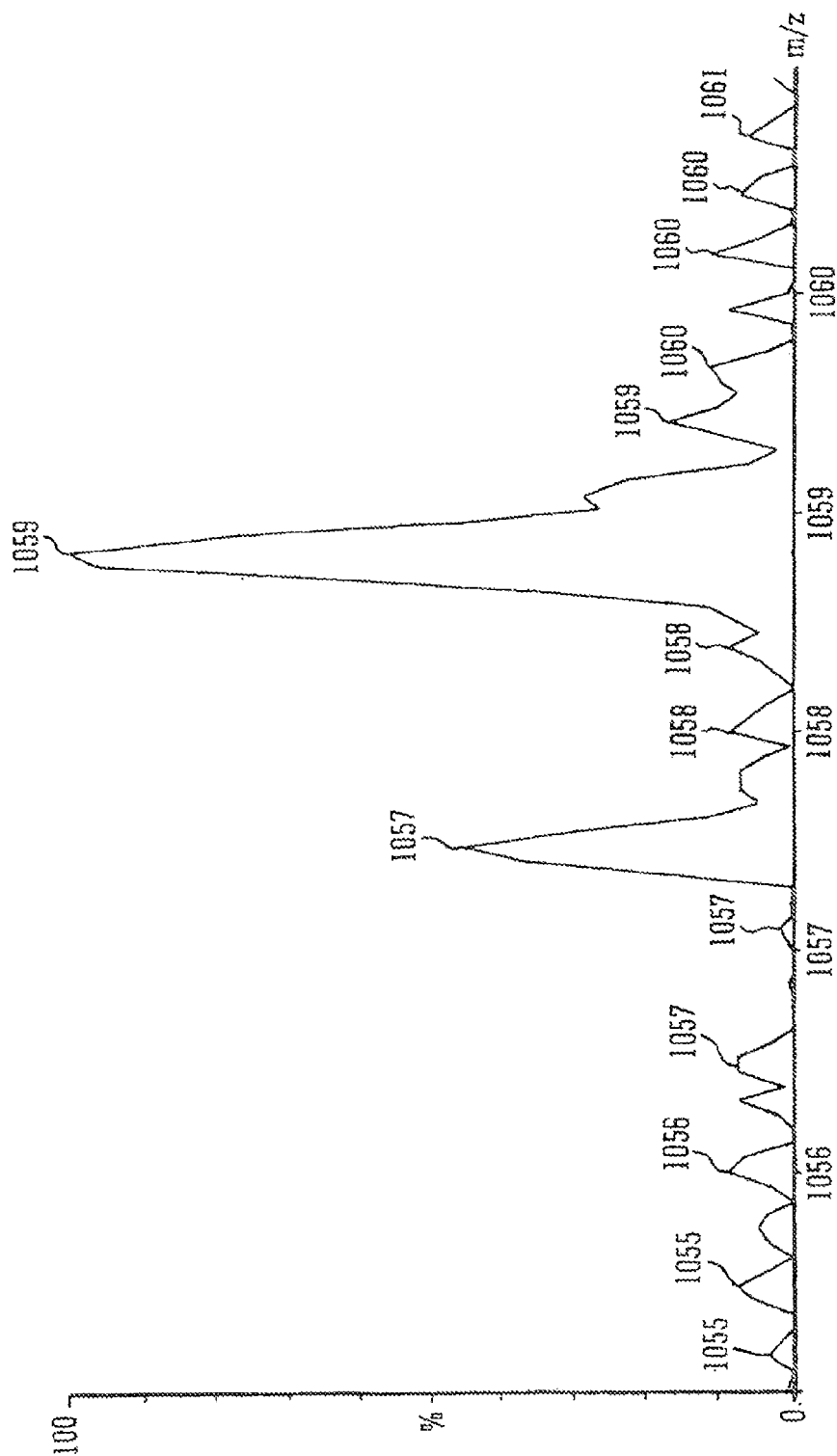
FIG. 2 shows a spectrum which was acquired from a single experimental run and which was summed together with other spectra to form the composite mass spectrum shown in FIG. 1.

FIG. 2 shows an individual spectrum across the same mass to charge ratio range as shown in FIG. 1. The signals arise from individual ions arriving at the ion detector.

Figure 3:
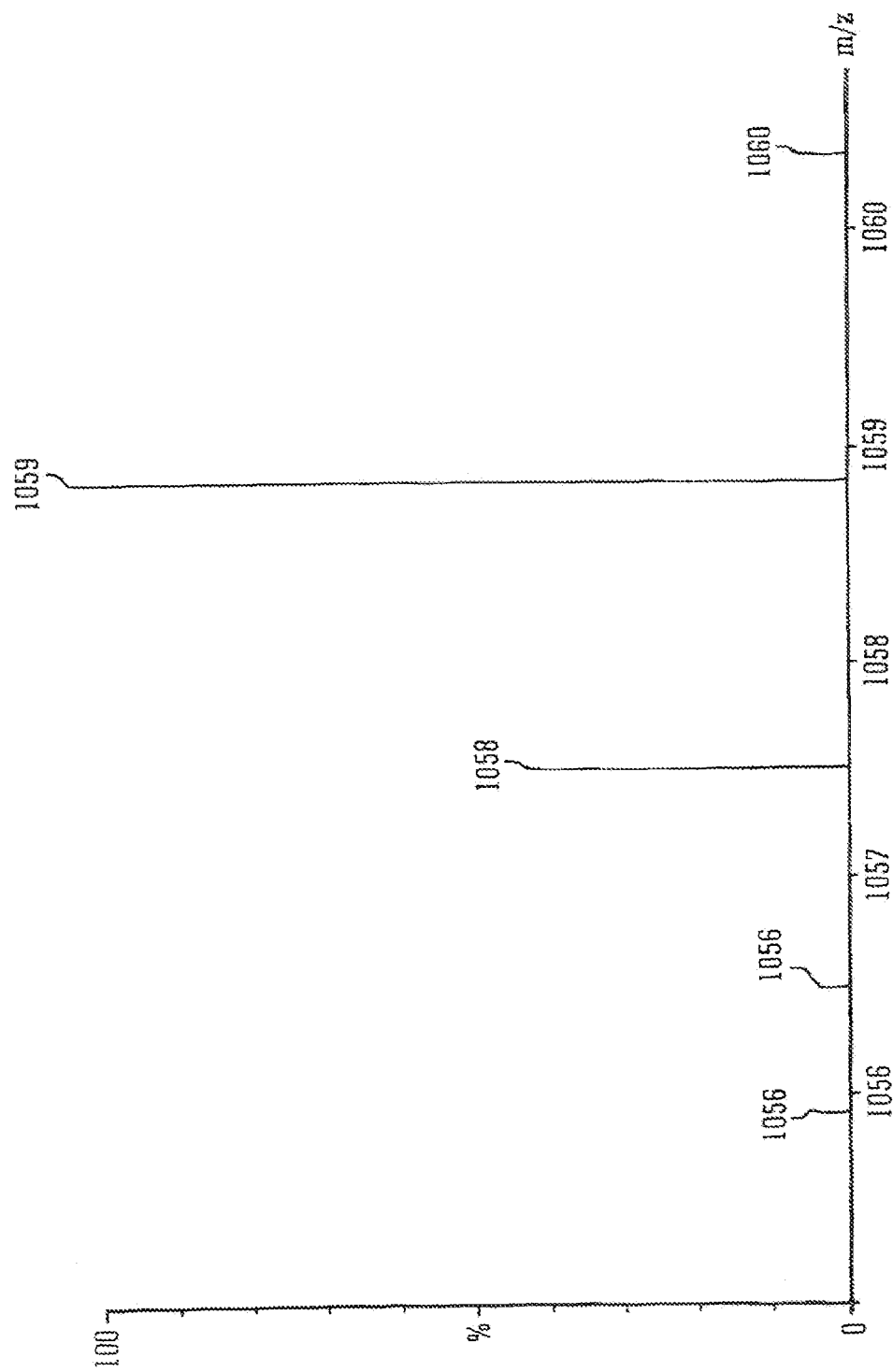
FIG. 3 shows the spectrum shown in FIG. 2 after being processed to provide data in the form of mass to charge and intensity pairs.

FIG. 3 shows the result of processing the individual spectrum shown in FIG. 2 by using a two pass moving average smoothing function (Eqn. 1) with a smoothing window of seven time digitisation points. The smoothed signal was then differentiated twice using a three-point moving window difference calculation (Eqn. 4). The zero crossing points of the second differential were determined as being the start and the end points of the signals of interest within the spectrum. The centroid of each signal was then determined using Eqn. 13. The time determined by Eqn. 14 and the intensity of each detected signal was recorded. The resulting processed mass spectral data is shown in FIG. 3 in the form of intensity-time pairs. The precision of the determination of the centroid calculation for each ion arrival was higher than the precision afforded by the individual time intervals of the Analogue to Digital Converter.

Figure 4:
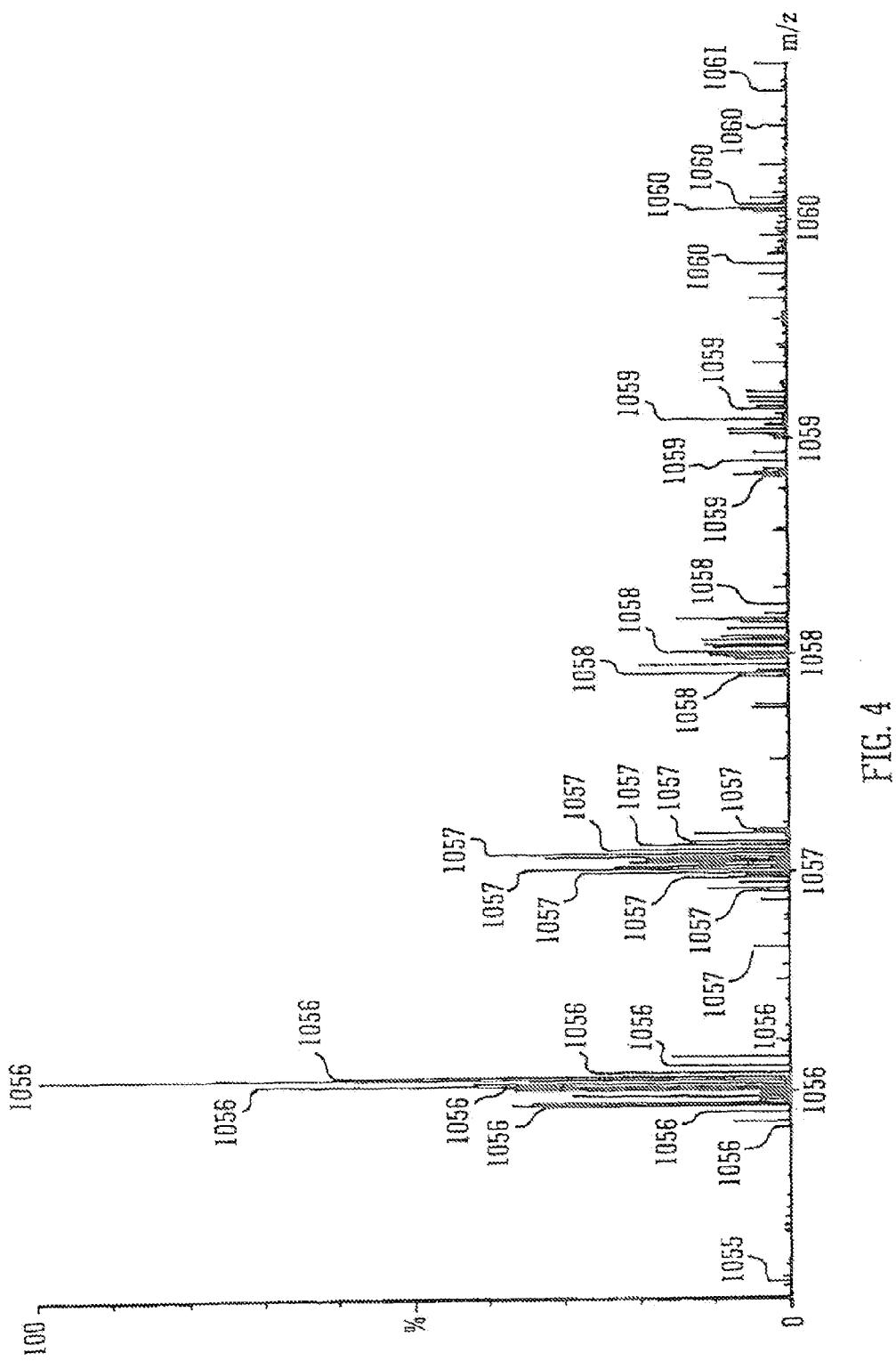
FIG. 4 shows the result of summing or combining 48 separate processed time of flight mass spectra.

FIG. 4 shows the result of combining the 48 individual spectra which have each been pre-processed using the method described above in relation to FIG. 3. The 48 sets of processed data comprising intensity-time pairs were combined to form a composite set of data comprising a plurality of intensity-time pairs.

Figure 5:
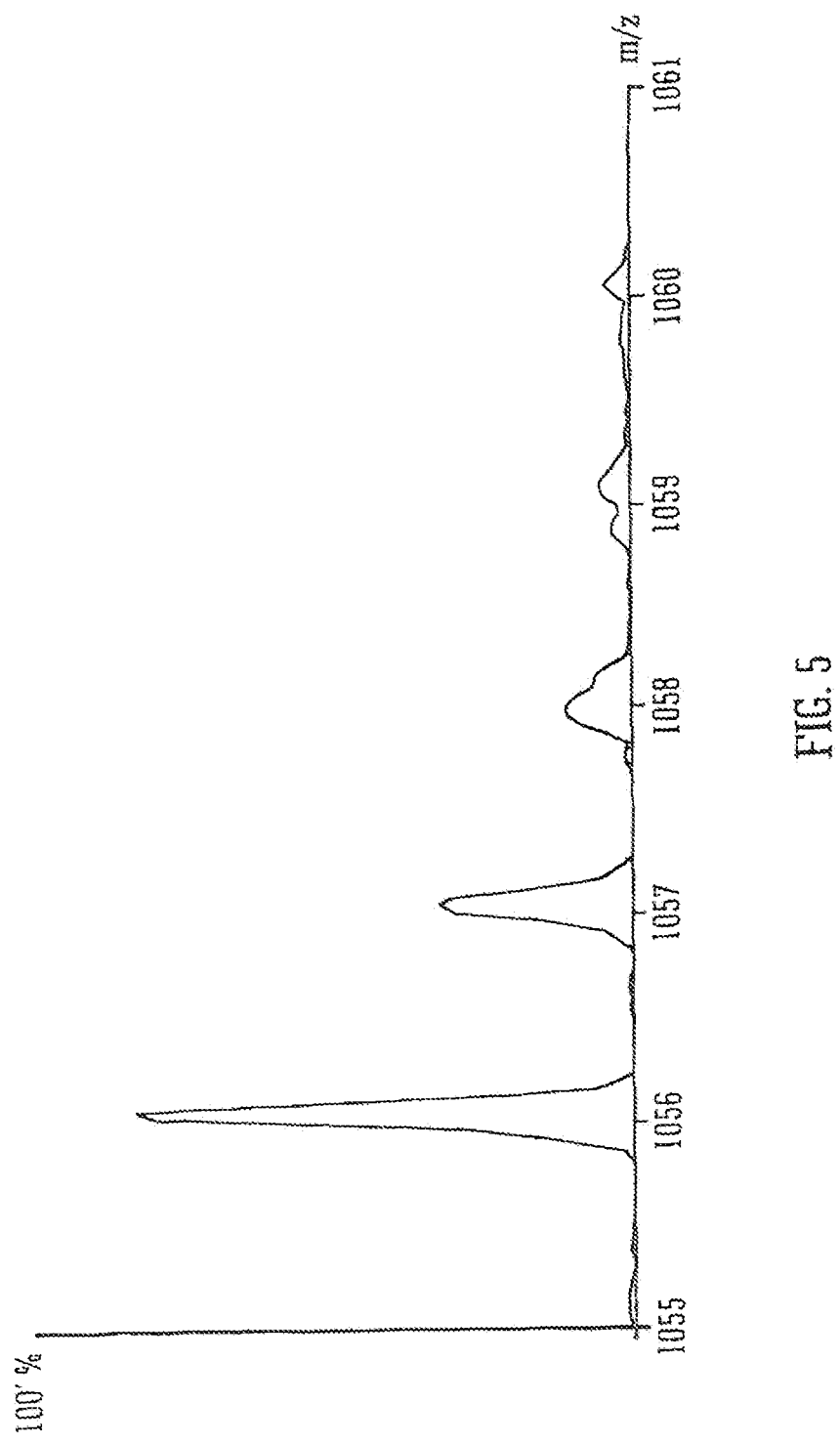
FIG. 5 shows the result of integrating the pairs of data shown in FIG. 4 using a boxcar integration algorithm in order to form a continuum mass spectrum.

Once a composite set of data as shown in FIG. 4 has been provided or obtained, then the composite data set is preferably integrated using, for example, two passes of a boxcar integration algorithm. According to an embodiment the integration algorithm may have a width of 615 ps and step intervals of 246 ns. The resulting integrated and smoothed data set or continuum mass spectrum is shown in FIG. 5. It can be seen that the mass resolution and the signal to noise within the spectrum is greatly improved compared to the raw Analogue to Digital Converter data or mass spectrum as shown in FIG. 1.

Figure 6:
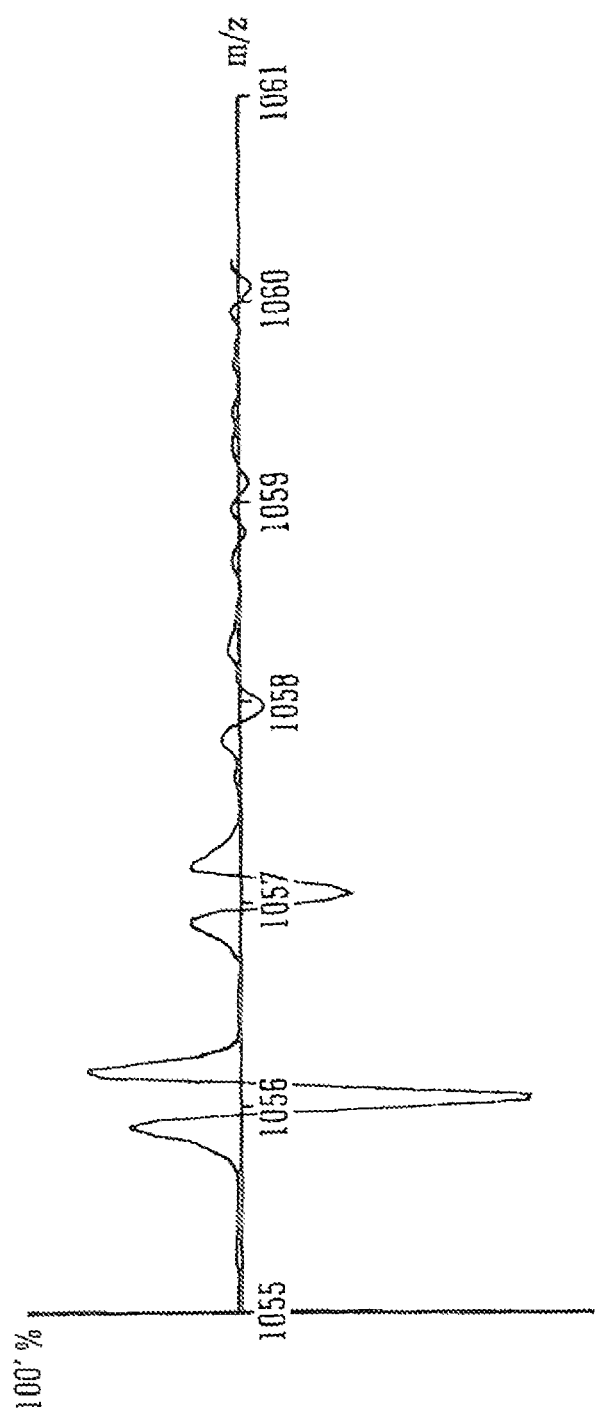
FIG. 6 shows the second differential of the continuum mass spectrum shown in FIG. 5.

FIG. 6 shows the second differential of the single processed continuum mass spectrum as shown in FIG. 5. The second differential was derived using a moving window of 1.23 ns. The zero crossing points of the second differential were used to determine the start and end points of the mass peaks observed within the continuum mass spectrum.

Figure 7:
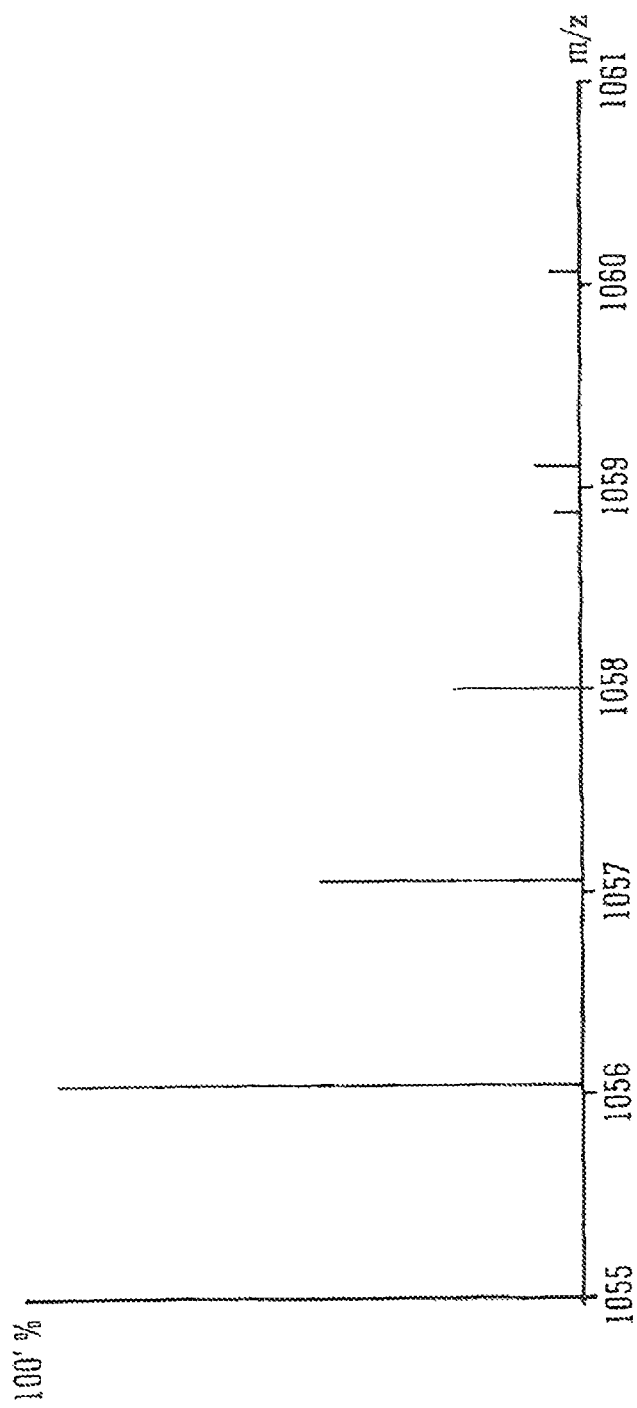
FIG. 7 shows the resultant mass peaks derived from the data shown in FIG. 4 by reducing the continuum mass spectrum shown in FIG. 5 to a discrete mass spectrum.

FIG. 7 shows the final mass to charge ratio and corresponding intensity values as displayed according to the preferred embodiment. The 48 spectra shown in FIG. 4 were integrated into a continuum mass spectrum and then the continuum mass spectrum was reduced to a discrete mass spectrum. The time of flight for each mass peak was determined using Eqn. 24 and the intensity of each mass peak was determined using Eqn. 21.

For all the spectra shown in FIGS. 1-7 the time axis has been converted into a mass to charge ratio axis using a time to mass relationship derived from a simple calibration procedure. At the masses shown the ADC digitisation interval of 0.5 ns is approximately equivalent to 0.065 Daltons in mass.

According to the preferred embodiment the time of flight detector (secondary electron multiplier) may comprise a microchannel plate, a photomultiplier or an electron multiplier or combinations of these types of detectors.

The digitisation rate of the ADC may be uniform or non-uniform.

According to an embodiment of the present invention the calculated intensity I and time of flight t of several voltage peaks may be combined into a single representative peak. If the number of voltage peaks in a spectrum is large and/or the number of spectra is large, then the final total number of voltage peaks may become very large. Therefore, combining data in this manner will advantageously reduce the memory requirements and the subsequent processing time.

Single representative peaks may be composed of constituent voltage peaks with a sufficient narrow range of times such that the integrity of the data is not compromised and so that the spectra or mass spectra maintain their resolution. It is desirable that peak or mass peak start and end times can still be determined with sufficient accuracy such that resultant peaks or mass peaks are composed of substantially the same voltage peaks that they would have had not this initial merging of peaks taken place. The single representative peak preferably has an intensity and time, of flight that accurately represents the combined intensity and the combined weighted time of flight of all the constituent voltage peaks. The intensity and time of flight of the resultant peak or mass peak is preferably substantially the same irrespective of whether or not some merging of voltage peaks has occurred in the processing of the data.

For completeness, FIG. 8 shows how an ion arrival time and corresponding intensity value may be converted into two intensity values which are added to two neighbouring time bins of a histogram. According to the preferred embodiment the two new areas $S_{(n)}$ and $S_{(n+1)}$ are preferably calculated and added to time locations or time bins having assigned time of $T_{(n)}$ and $T_{(n+1)}$ where:

$$S_{(n)}+S_{(n+1)}=So$$

$$S_{(n)}\cdot T_{(n)}+S_{(n+1)}\cdot T_{(n+1)}=So\cdot To.$$

Therefore:

$$S_{(n)}=So\cdot(T_{(n+1)}-To)/(T_{(n+1)}-T_{(n)})$$

$$S_{(n+1)}=So-S_{(n)}$$

The precision of the original data is preferably preserved according to the preferred embodiment.

Conventional Amplitude Thresholding Noise Rejection

Figure 9:
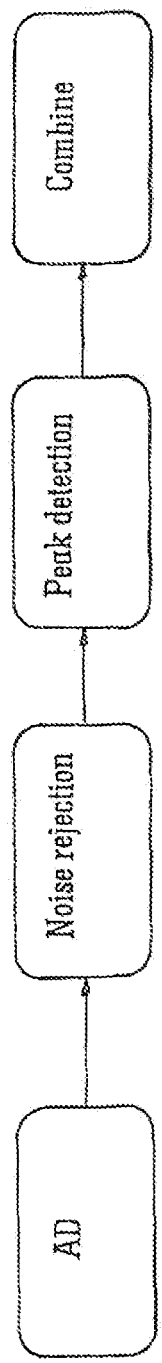
FIG. 9 shows a flow diagram illustrating a known detector system wherein an amplitude threshold is applied to mass spectral data so that only peaks having an amplitude in excess of the amplitude threshold are subsequently detected.

FIG. 9 shows a flow diagram illustrating a method of processing mass spectral data wherein the output from a ADC is subjected to an amplitude thresholding (not a peak area thresholding). According to the known approach ion peaks and noise spikes having an amplitude less than a threshold amplitude are rejected as noise. However, as will be shown with reference to FIG. 10, the conventional amplitude thresholding approach suffers from the problem that at least some ion peaks may be rejected as noise and that some noise spikes may be considered as corresponding with ion peaks.

Figure 10:
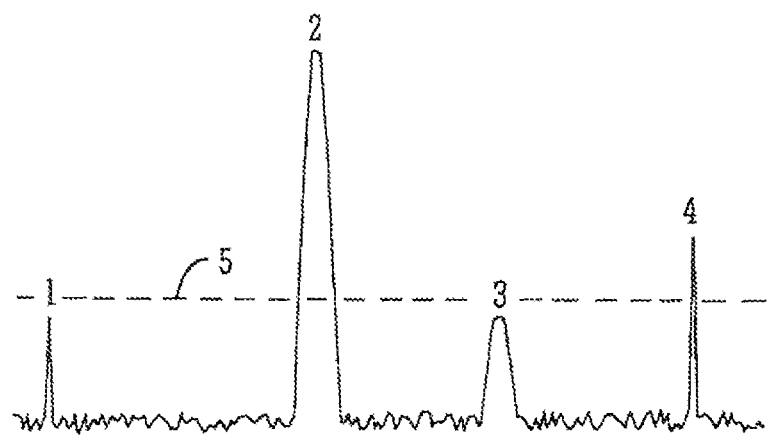
FIG. 10 shows a conventional amplitude threshold being applied to mass spectral data.

FIG. 10 shows a conventional amplitude threshold 5 being applied to a signal comprising two ion peaks 2,3 and two noise spikes 1,4 with the intended purpose of rejecting noise spikes. The conventional amplitude thresholding approach correctly rejects a small amplitude noise spike 1 and correctly detects a large amplitude on peak 2. However, the conventional amplitude thresholding approach incorrectly rejects a small amplitude ion peak 3 and also incorrectly interprets a large amplitude noise spike 4 as being an ion peak.

Preferred Embodiment

Figure 11:
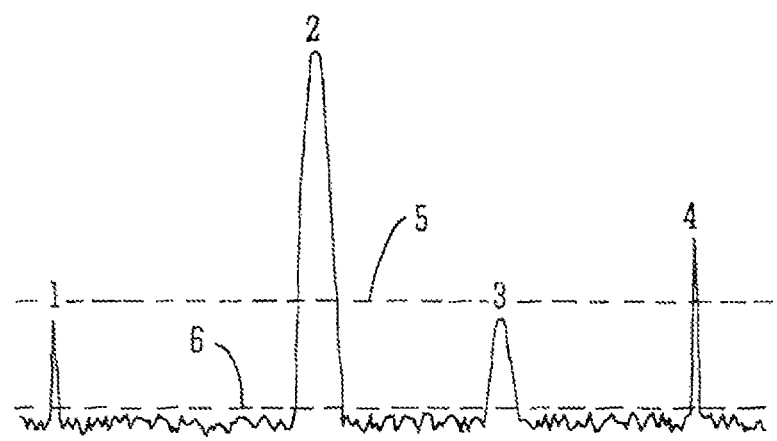
FIG. 11 shows an embodiment of the present invention wherein a reduced amplitude threshold is applied to mass spectral data.

FIG. 11 illustrates various aspects according to a preferred embodiment of the present invention. According to the preferred embodiment a relatively low amplitude threshold 6 may initially be applied to the output signal from an ADC. According to this embodiment two noise spikes 1,4 and two ion peaks 2,3 are passed by the amplitude threshold which is set at a relatively low level just above the average background noise level, but the majority of background noise is filtered out.

According to the preferred embodiment the noise spikes 1,4 and ion peaks 2,3 are then subjected to peak detection. As a result of the peak detection routine the noise spikes 1,4 and ion peaks 2,3 are converted into data pairs comprising time (or mass or mass to charge ratio) and peak area (or intensity). This is shown in FIG. 12.

Figure 12:
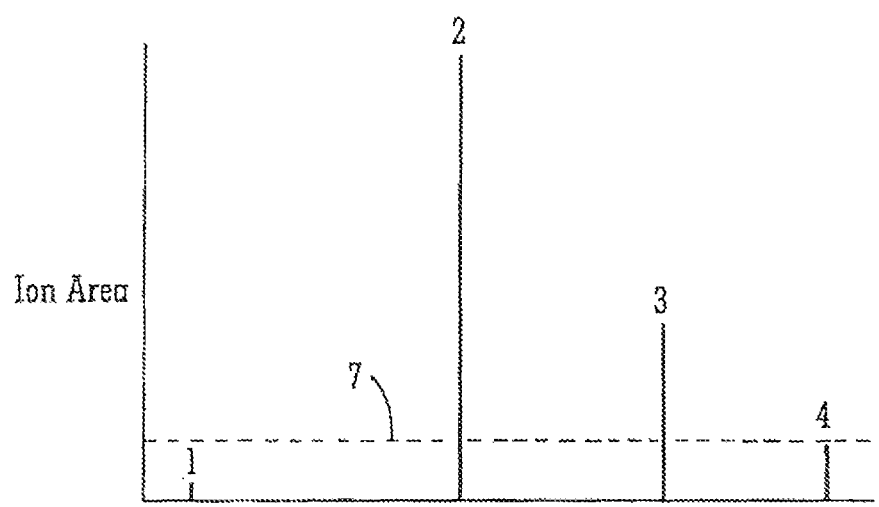
FIG. 12 shows a preferred embodiment of the present invention wherein an area threshold is applied to the mass spectral data enabling noise peaks to be discriminated from ion peaks.

According to the preferred embodiment once the noise spikes 1,4 and ion peaks 2,3 have been detected then the areas of the noise spikes 1,4 and ion peaks 2,3 are analysed and are compared to a peak area threshold 7 as shown in FIG. 12. According to the preferred embodiment noise spikes 1,4 have a peak area below that of the threshold peak area 7 and hence the noise spikes 1,4 are correctly rejected by the system as relating to noise spikes. By contrast however, ion peaks 2,3 are determined as having a peak area above the threshold peak area 7 and hence are correctly determined as relating to ion peaks.

According to the preferred embodiment noise spikes are discriminated from ion peaks by virtue of the noise spikes having a smaller area (but not necessarily a smaller intensity) than ion peaks. It is also observed that instrument noise is evenly distributed in time. Ion peaks have a skewed distribution about the background noise level and ion peaks are observed as having a peak area in excess of an area threshold corresponding to noise spikes.

Figure 13:
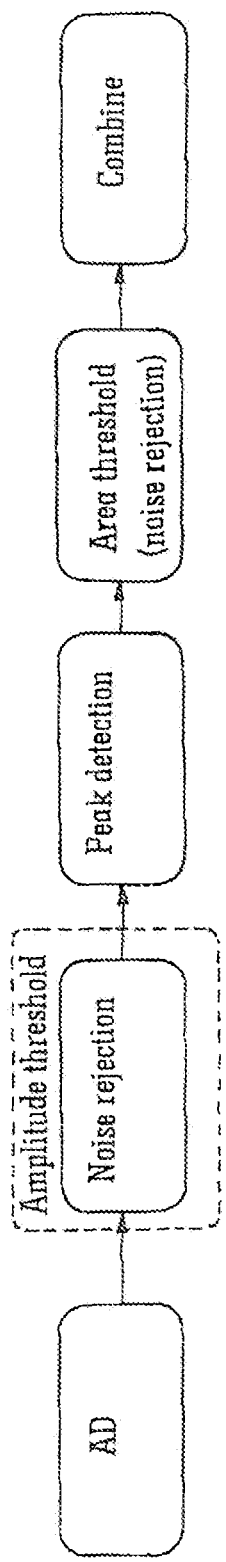
FIG. 13 shows a flow diagram illustrating a detector system according to a preferred embodiment of the present invention wherein a low amplitude threshold may be applied to the mass spectral, peaks are detected and wherein noise peaks having a relatively low area are rejected whereas ion peaks having a relatively high area are unaffected.

FIG. 13 shows a flow diagram illustrating aspects of the preferred embodiment of the present invention. According to the preferred embodiment the output from a ADC is preferably subjected to a relatively low amplitude threshold in order to reject at least some background noise. According to the preferred embodiment ion peaks and some noise spikes are preferably not filtered out by the relatively low amplitude noise threshold applied to the output of the ADC. The ion peaks and noise spikes which are not filtered out by the low amplitude threshold are then subjected to peak detection which preferably results in data being produced in the form of time and peak area values. According to the preferred embodiment peaks having a peak area below a preferred or predetermined peak area threshold are preferably rejected, attenuated or otherwise filtered out as relating to noise spikes rather than ion peaks. The time and intensity data which remains after the preferred area thresholding step is then preferably combined or integrated with other time and intensity data in order to produce a composite mass spectrum. An important aspect of the preferred embodiment is that area thresholding is performed prior to combining mass spectral data i.e. peak area thresholding is preferably performed on a push-by-push basis.

Although the present invention has been described with reference to preferred embodiments, it will be understood by those skilled in the art that various changes in form and detail may be made to the particular embodiments discussed above without departing from the scope of the present invention as set forth in the accompanying claims.

The invention claimed is:

1. A method of mass spectrometry comprising:
digitising a first signal output from an ion detector to produce a first digitised signal;
detecting a first set of peaks in said first digitised signal and determining an arrival time To and peak area So of one or more peaks in said first set of peaks thereby forming a first list of data pairs, each data pair comprising an arrival time value and a peak area value; and
filtering out, attenuating or otherwise rejecting one or more data pairs from said first list thereby forming a second reduced list by using peak area thresholding, wherein a data pair is filtered out, attenuated or otherwise rejected from said first list if the peak area value of a data pair in said first list is determined to be less than a threshold peak area.

2. A method as claimed in claim 1, further comprising after said step of filtering out, attenuating or otherwise rejecting one or more data pairs a step of:
converting the determined arrival time values $T_o$ of data pairs in said second reduced list into a first arrival time $T_n$ and a second arrival time $T_{n+1}$ or converting the determined peak area values $S_o$ of data pairs in said second reduced list into a first peak area $S_n$ and a second peak area $S_{n+1}$.

3. A method as claimed in claim 1, further comprising applying an amplitude threshold to said first digitised signal prior to determining said arrival time $T_o$ and prior to determining said peak area $S_o$ of one or more peaks in said first set of peaks in order to filter out at least some noise spikes from said first digitised signal.

4. A method as claimed in claim 2, further comprising:
storing said first arrival time $T_n$ or said second arrival time $T_{n+1}$ in two or more substantially neighbouring or adjacent pre-determined time bins or memory locations; or
storing said first peak area $S_n$ or said second peak area $S_{n+1}$ in two or more substantially neighbouring or adjacent pre-determined time bins or memory locations.

5. A method as claimed in claim 1, further comprising:
digitising one or more further signals output from said ion detector to produce one or more further digitised signals;
detecting a first set of peaks in said one or more further digitised signals and determining an arrival time $T_o$ and peak area $S_o$ of one or more peaks in said first set of peaks corresponding to said one or more further digitised signals thereby forming a further first list of data pairs, each data pair comprising an arrival time value and a peak area value; and
filtering out, attenuating or otherwise rejecting one or more data pairs from said further first list corresponding to said one or more further digitised signals thereby forming a further second reduced list, wherein a data pair is filtered out, attenuated or otherwise rejected from said further first list corresponding to said one or more further digitised signals if the peak area value of a data pair in said further first list is determined to be less than a threshold peak area.

6. A method as claimed in claim 5, further comprising after said step of filtering out, attenuating or otherwise rejecting one or more data pairs from said further first list corresponding to one or more further digitised signals a step of:
converting the determined arrival time values $T_o$ of data pairs in said further second reduced list corresponding to said one or more further digitised signals into a first arrival time $T_n$ and a second arrival time $T_{n+1}$ or converting the determined peak area values $S_o$ of data pairs in said further second reduced list corresponding to said one or more further digitised signals into a first peak area $S_n$ and a second peak area $S_{n+1}$.

7. A method as claimed in claim 5, wherein said one or more further signals comprise at least 5, 10, 15, 20, 25, 30, 35, 40, 45, 50, 55, 60, 65, 70, 75, 80, 85, 90, 95, 100, 200, 300, 400, 500, 600, 700, 800, 900, 1000, 2000, 3000, 4000, 5000, 6000, 7000, 8000, 9000 or 10000 signals from said ion detector, each signal corresponding to a separate experimental run or acquisition.

8. A method as claimed in claim 6, further comprising combining or histogramming said first peak area value $S_n$ and said second peak area value $S_{n+1}$ corresponding to said first digitised signal with said first peak area value(s) $S_n$ and said second peak area value(s) $S_{n+1}$ corresponding to said one or more further digitised signals to form a composite time or mass spectrum.

9. A mass spectrometer comprising:
a device arranged and adapted to digitise a first signal output from an ion detector to produce a first digitised signal;
a device arranged and adapted to detect a first set of peaks in said first digitised signal and to determine an arrival time $T_o$ and peak area $S_o$ of one or more peaks in said first set of peaks thereby forming a first list of data pairs, each data pair comprising an arrival time value and a peak area value; and
a device arranged and adapted to filter out, attenuate or otherwise reject one or more data pairs from said first list thereby forming a second reduced list by using peak area thresholding, wherein a data pair is filtered out, attenuated or otherwise rejected from said first list if the peak area value of a data pair in said first list is determined to be less than a threshold peak area.

10. A method of mass spectrometry comprising:
digitising a first signal output from an ion detector to produce a first digitised signal;
detecting a first set of peaks in said first digitised signal and determining an arrival time To or mass or mass to charge ratio $M_o$ and peak area $S_o$ of one or more peaks in said first set of peaks thereby forming a first list of data pairs, each data pair comprising a mass or mass to charge ratio value and a peak area value; and
filtering out, attenuating or otherwise rejecting one or more data pairs from said first list thereby forming a second reduced list by using peak area thresholding, wherein a data pair is filtered out, attenuated or otherwise rejected from said first list if the peak area value of a data pair in said first list is determined to be less than a threshold peak area.

11. A method as claimed in claim 10, further comprising:
converting the determined arrival time values $T_o$ or mass or mass to charge ratio values $M_o$ of data pairs in said second reduced list into a first mass or mass to charge ratio $M_n$ and a second mass or mass to charge ratio $M_{n+1}$ or converting the determined peak area values $S_o$ of data pairs in said second reduced set of peaks into a first peak area $S_n$ and a second peak area $S_{n+1}$.

12. A mass spectrometer comprising:
a device arranged and adapted to digitise a first signal output from an ion detector to produce a first digitised signal;
a device arranged and adapted to detect a first set of peaks in said first digitised signal and to determine an arrival time $T_o$ or mass or mass to charge ratio $M_o$ and peak area $S_o$ of one or more peaks in said first set of peaks thereby forming a first list of data pairs, each data pair comprising a mass or mass to charge ratio value and a peak area value; and a device arranged and adapted to filter out, attenuate or otherwise reject one or more data pairs from said first list thereby forming a second reduced list by using peak area thresholding, wherein a data pair is filtered out, attenuated or otherwise rejected from said first list if the peak area value of a data pair in said first list is determined to be less than a threshold peak area.

13. A mass spectrometer as claimed in claim 12, further comprising:

a device arranged and adapted to convert the determined arrival time values $T_o$ or mass or mass to charge ratio values $M_o$ of data pairs in said second reduced list into a first mass or mass to charge ratio $M_n$ and a second mass or mass to charge ratio $M_{n+1}$ or to convert the determined peak area values $S_o$ of data pairs in said second reduced set of peaks into a first peak area $S_n$ and a second peak area $S_{n+1}$.

* * * * *